(12) United States Patent
Koike

(10) Patent No.: US 6,785,942 B2
(45) Date of Patent: *Sep. 7, 2004

(54) MACHINE TOOL SYSTEM AND METHOD OF REPLACING PALLET OF THE DEVICE

(75) Inventor: Shinji Koike, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 8 days.

This patent is subject to a terminal disclaimer.

(21) Appl. No.: 10/049,083

(22) PCT Filed: Feb. 28, 2001

(86) PCT No.: PCT/JP01/01528

§ 371 (c)(1),
(2), (4) Date: Feb. 6, 2002

(87) PCT Pub. No.: WO01/94071

PCT Pub. Date: Dec. 13, 2001

(65) Prior Publication Data

US 2002/0116805 A1 Aug. 29, 2002

(30) Foreign Application Priority Data

Jun. 9, 2000 (WO) .................... PCT/JP00/03787

(51) Int. Cl.[7] .............................................. B23Q 37/00
(52) U.S. Cl. .......................... 29/33 P; 29/563; 29/564; 409/201
(58) Field of Search ............................. 29/33 P, 563, 29/564; 409/221, 222, 158, 159, 164, 198, 189, 165, 168, 172, 137, 201; 414/808, 800, 802

(56) References Cited

U.S. PATENT DOCUMENTS

| | | | |
|---|---|---|---|
| 5,172,464 A | * 12/1992 | Kitamura et al. | ............. 29/563 |
| 5,265,986 A | * 11/1993 | Prokopp | ................... 408/3 |
| 5,321,874 A | * 6/1994 | Mills et al. | ................. 29/33 P |
| 5,564,483 A | 10/1996 | Sacchi | |
| 5,662,568 A | * 9/1997 | Lindem | ................... 483/30 |
| 5,718,545 A | * 2/1998 | Husted | ................. 409/201 |
| 5,868,545 A | * 2/1999 | Kasai et al. | ............... 414/808 |
| 5,933,933 A | 8/1999 | Fritz et al. | |
| 5,996,329 A | * 12/1999 | Cardenas | ................. 409/201 |
| 6,099,217 A | * 8/2000 | Wiegand et al. | ........... 409/201 |

(List continued on next page.)

FOREIGN PATENT DOCUMENTS

| | | |
|---|---|---|
| EP | 0463453 | 1/1992 |
| EP | 614724 | 9/1994 |
| EP | 650800 | 5/1995 |

(List continued on next page.)

Primary Examiner—A. L. Wellington
Assistant Examiner—Dana Ross
(74) Attorney, Agent, or Firm—Paul & Paul

(57) ABSTRACT

The present invention relates to a machine tool (11) for machining a large-sized workpiece (89) such as aircraft parts mounted on a workpiece mounting table (99), by moving a spindle having a tool mounted thereon in directions along the X-axis, the Y-axis and the Z-axis. The machine tool (11) can provide a highly efficient, high-speed and highly precise machining for a large-sized workpiece (89) and solve a problem of a compact installation area. In order to solve this problem, according to the present invention, a workpiece support structure (15) is disposed in opposed relation to a spindle support structure (13) which a spindle head (73) movable in the directions along the X-axis, the Y-axis and the Z-axis. The workpiece mounting table (99) of the workpiece support structure (15) is provided with pallet securing means on two opposed pallet mounting surfaces thereof and is supported to allow for rotational indexing about a horizontal axis extending in the direction along the X-axis. The workpiece (89) is machined by setting one of the pallet mounting surfaces in a horizontal state to mount a pallet (105) thereon and then by positioning the pallet (105) in a vertical state by rotational indexing means.

9 Claims, 19 Drawing Sheets

U.S. PATENT DOCUMENTS

| | | |
|---|---|---|
| 6,185,802 B1 | 2/2001 | Gruber et al. .................. 29/38 |
| 6,210,086 B1 * | 4/2001 | Lecornet et al. ............ 409/137 |
| 6,431,802 B1 * | 8/2002 | Wahl .......................... 409/201 |
| 6,447,224 B2 * | 9/2002 | Mitsuzono et al. ......... 409/201 |
| 6,554,551 B1 * | 4/2003 | Marelli ....................... 409/201 |
| 2001/0021338 A1 * | 9/2001 | Mitsuzono et al. ......... 409/201 |

FOREIGN PATENT DOCUMENTS

| | | |
|---|---|---|
| EP | 0985488 | 3/2000 |
| JP | 59-28753 | 8/1984 |
| JP | 60-42044 | 12/1985 |
| JP | 61-53182 | 11/1986 |
| JP | 64-27832 | 1/1989 |
| JP | 8-1220 | 1/1996 |
| JP | 8-206935 | 8/1996 |
| JP | 9-262727 | 10/1997 |
| JP | 9-314433 | 12/1997 |
| JP | 10-263960 | 10/1998 |
| JP | 2598228 | 6/1999 |
| JP | 2000-61755 | 2/2000 |
| JP | 3050280 | 3/2000 |

* cited by examiner

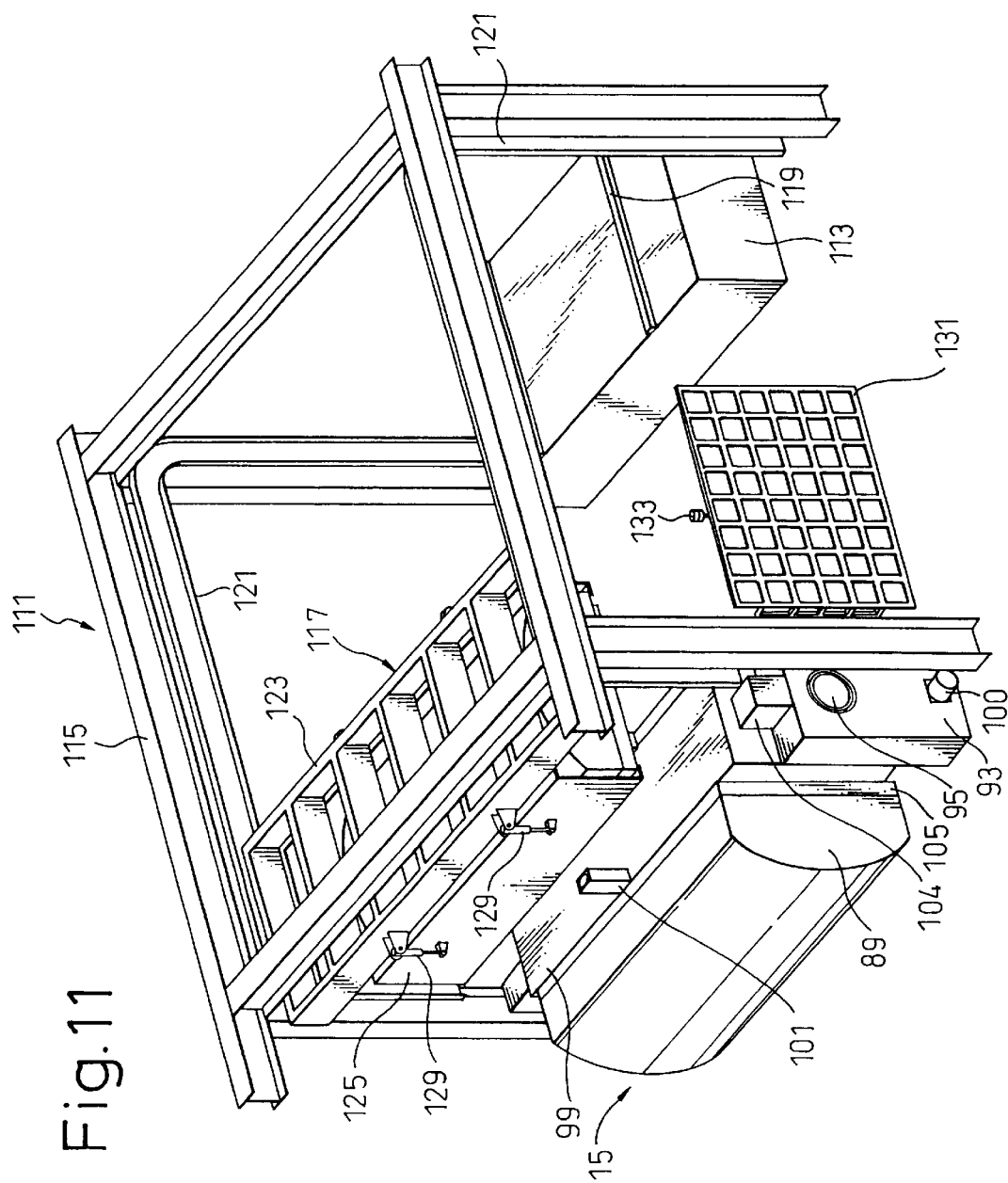

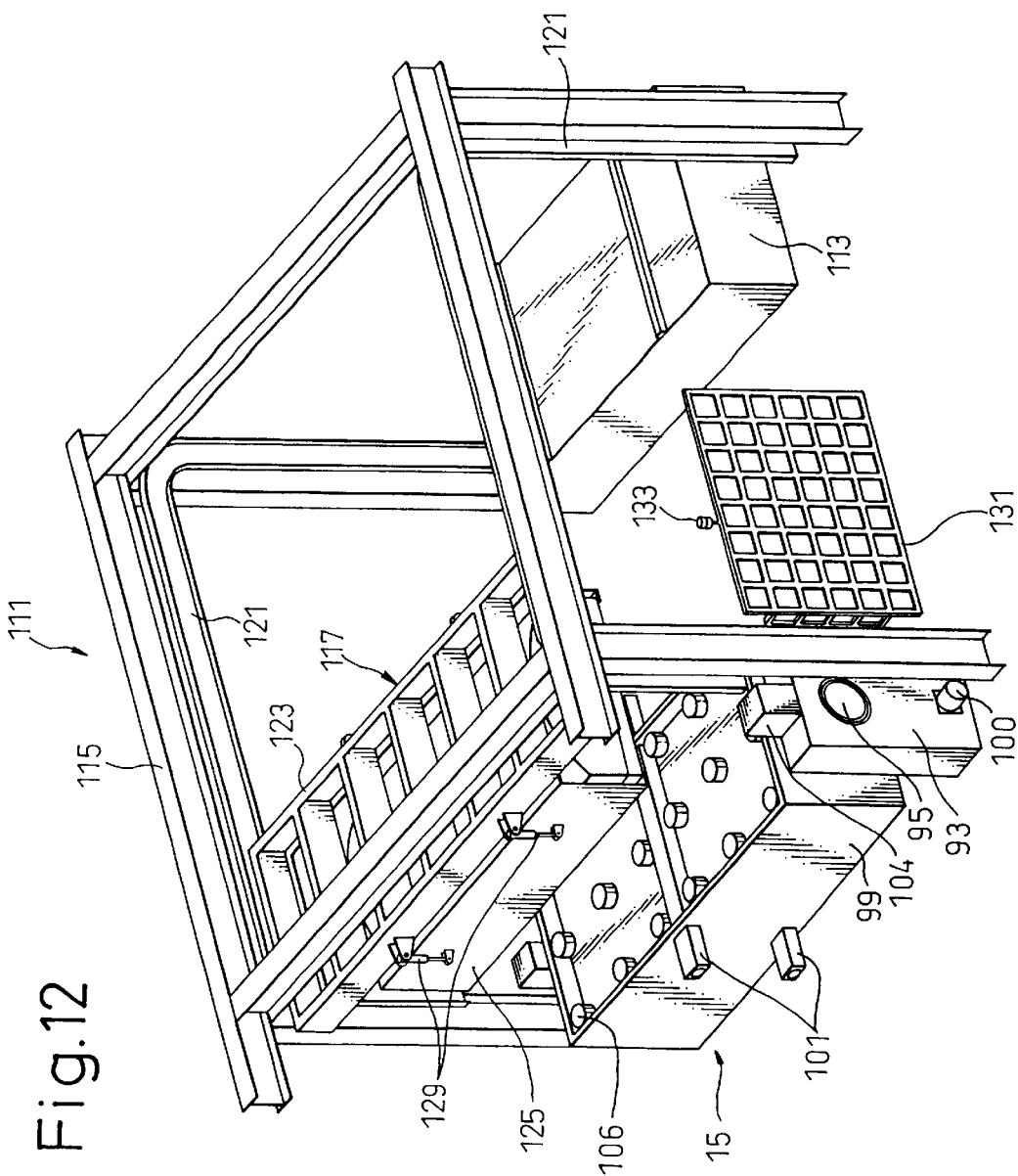

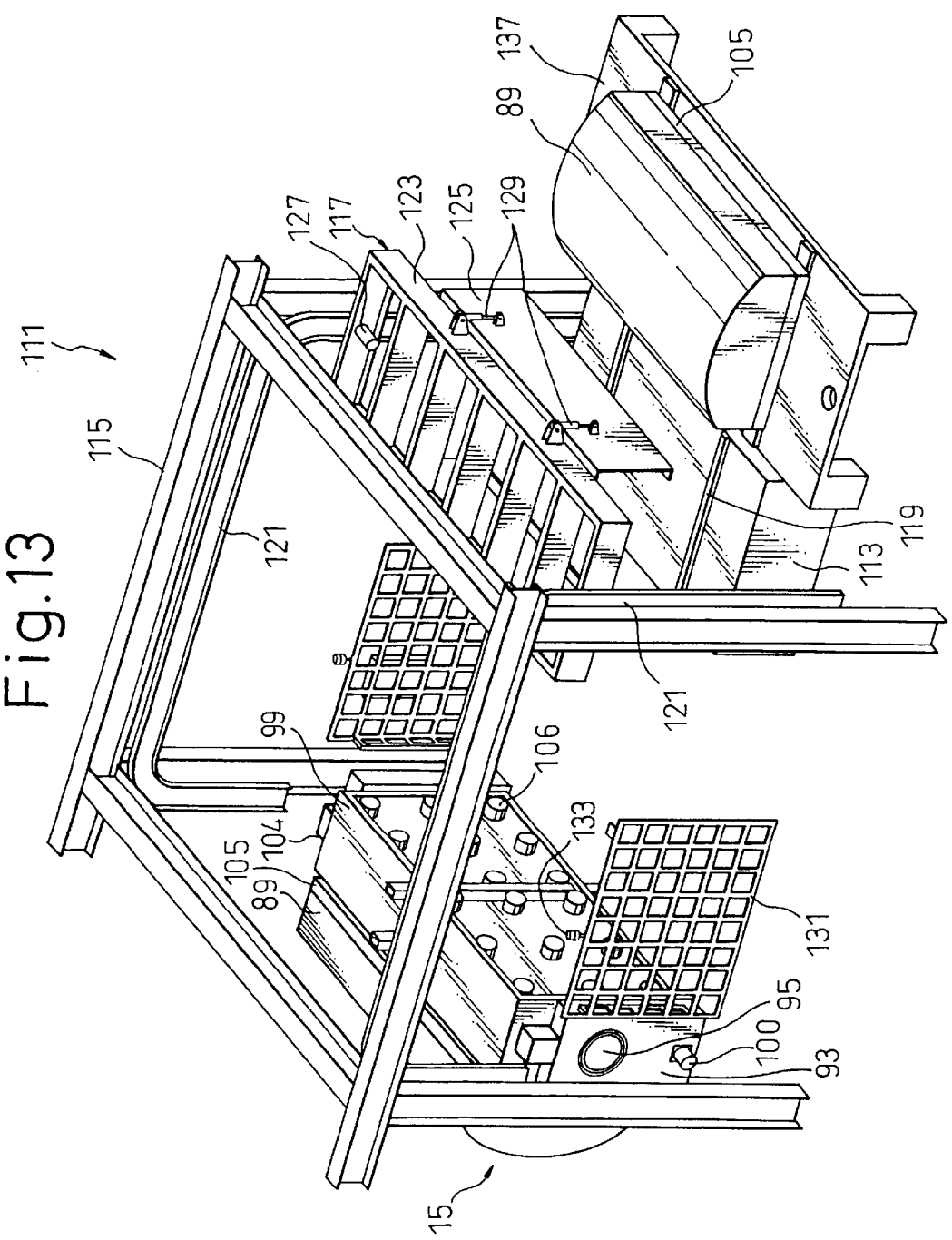

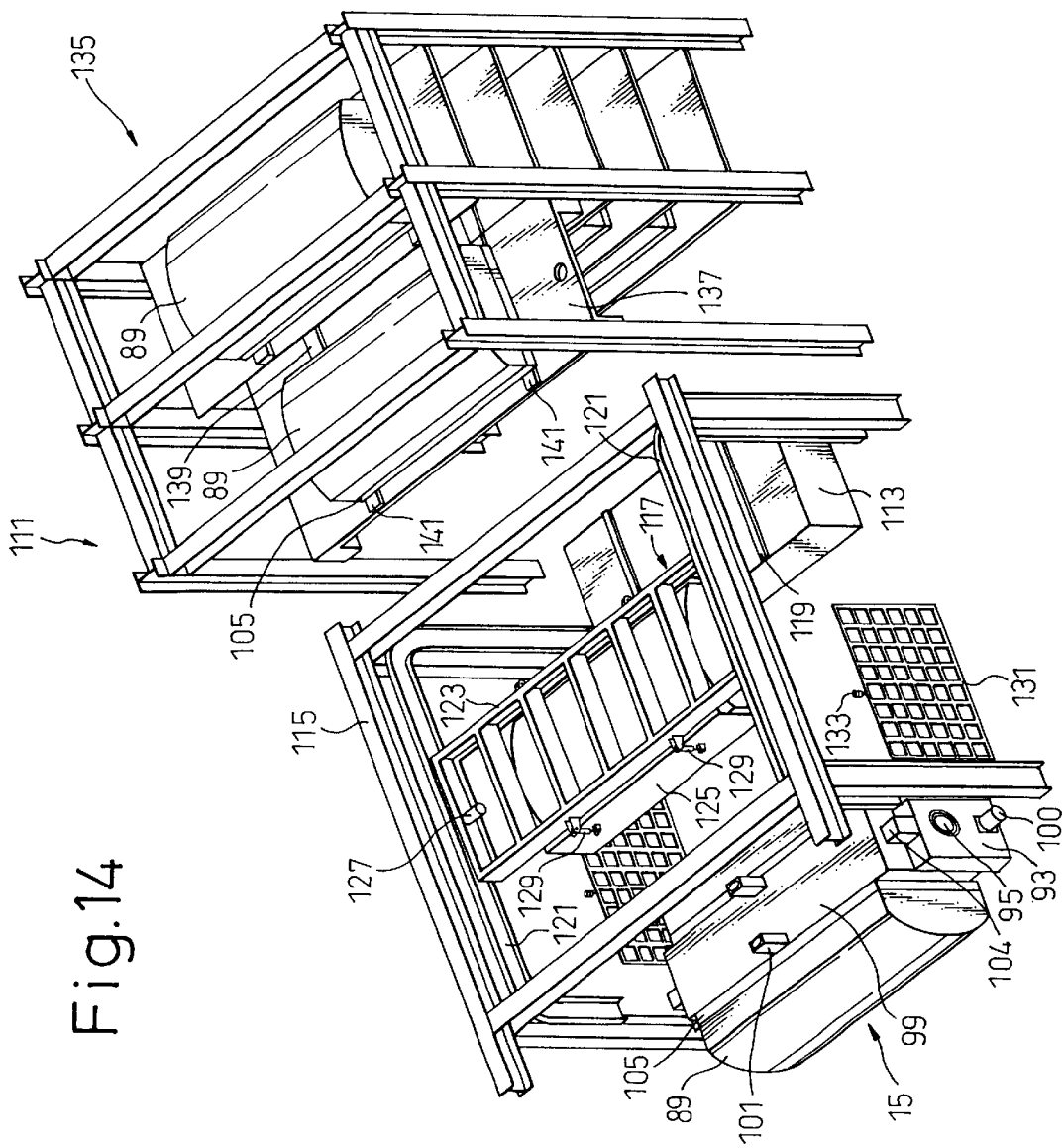

MACHINE TOOL SYSTEM AND METHOD OF REPLACING PALLET OF THE DEVICE

TECHNICAL FIELD

The present invention relates to a machine tool system for machining a large-sized workpiece such as an aircraft part mounted on a workpiece mounting table, by moving a spindle having a tool mounted thereon in the directions along the X-axis, the Y-axis and the Z-axis with respect to the workpiece and, more specifically, to a novel machine tool system such as a machining center, which includes a spindle support structure having a spindle arranged to be movable in the directions along the X-axis, the Y-axis and the Z-axis, and a workpiece mounting table opposed to the spindle support structure, the workpiece mounting table having two pallet mounting surfaces and supporting the pallet mounting surfaces to allow them to be rotationally indexed in a desired position, and which can provide a highly efficient, high-speed and highly precise maching even for a large-sized workpiece and requires only a compact area for installation. The present invention also relates to a method for exchanging pallets in the machine tool system.

BACKGROUND ART

In the prior art, a method has been employed in which an airframe of an aircraft is constructed by dividing it into small components to be machined and by joining the components with bolts or rivets. In recent years, however, the trend is toward integrating those parts as far as possible and thereby reducing the number of joins. As a result, the parts to be machined have increased in size and have become complicated in shape, thereby giving rise to the demand for a novel machine tool for machining such parts.

The unique performance requirements for such a machine tool include the provision of a table on which a large-sized workpiece to be machined can be mounted, the provision of a sufficient stroke in feed axes to machine the large workpiece and the possibility of machining a large-sized part having a complicated shape at any portion, and in any kind of shape, by a single setup. Further, such a part must be machined efficiently, at a high speed and with high precision. Also, in view of fact that a desired size of a workpiece to be machined will vary from one machine tool user to another, the machine tool having a size required by each user can be manufactured timely and promptly and installed in the factory.

For purpose of fixedly mounting a large workpiece, the table of the machine tool has to be large, and it is necessary to take into consideration that the movability of the large table in the directions along three orthogonal feed axes, i.e., the X- Y- and Z-axes or in the directions along three rotational feed axes, i.e., the A- B- and C-axes is disadvantageous from the viewpoint of high-speed and highly precise machining. More specifically, unlike normal machine tools, a machine tool for machining a large workpiece requires that the spindle rotating with the tool held thereon is provided with orthogonal feed means and rotational feed means and is thereby movable in the directions along orthogonal feed axes and in the directions along rotational feed axes, in order to allow the workpiece to be machined with the table being fixed (in a stationary state) during the machining.

It is noted that the X-axis and the Y-axis are orthogonal to each other in a vertical plane, and extend horizontally and vertically, respectively, while the Z-axis extends in a horizontal direction perpendicular to the X-axis and the Y-axis. It is also noted that the directions along the A- B- and C-axis are defined as the directions of rotation about the X- Y- and Z-axes, respectively.

In addition, as a large workpiece is liable to deteriorate the efficiency of a workpiece setup process, it is required to provide means for automatically changing the workpiece thereby to improve the efficiency of the setup process and an operating rate of the machine tool.

Generally, in case that the workpiece is machined to a desired shape by a machine tool such as a machining center, the desired machining of the workpiece is efficiently performed by mounting the workpiece on a pallet and by exchanging the pallets between the pallet stocker and the workpiece mounting table of the machine tool including the table.

For such an efficient pallet exchange, components such as a pallet stocker acting as a setup station for performing the setup process therein, pallet changing means for replacing one pallet having a workpiece mounted thereon with another by transferring and carrying them, a pallet magazine for storing a plurality of pallets having a workpiece mounted thereon and pallet transferring means for transferring the pallets between the pallet magazine and the pallet stocker are required. Therefore, the large-sized machine tool for handling the pallets having relatively large workpiece mounted thereon is uselessly enlarged in its entire installation area unless these components are provided.

Further, such large workpieces are often mounted on the pallets by a vacuum method and may fall off the pallets, if the pallets are transported in a vertical state, to harm the workers in the worst case. In addition, the pallets in the vertical state are poorly balanced during the transportation, and some the workpieces mounted on the pallets may decline the pallets thereby to make it seriously difficult to mount the pallets on the workpiece mounting table of the machine tool. It is, therefore, desirable that the pallets having the large workpiece mounted thereon are handled in the horizontal state.

Further, in case that the large workpiece is machined, the time required for a setup process of mounting a workpiece on a pallet and for an exchange process of pallets is often substantially equal to that required for activating the machine tool to actually machine the workpiece. Therefore, since the setup time and the pallet exchanging time occupy a considerable ratio to that required for machining one workpiece, the shortening of the setup time and the pallet changing time may directly achieve high-speed machining and an improved machine operating rate.

A first prior art available for realizing the aforementioned requirements is a symmetric multiaxial linear motor machine tool, as disclosed in Unexamined Japanese Patent Publication (Kokai) No. 8-318445. The machine tool includes a vertical gantry movable in a direction along the X-axis on vertically opposed frames, a saddle movable in a direction along the Y-axis on the vertical gantry, a ram adapted to be movable in a direction along the Z-axis on the saddle, a spindle head disposed at the front end portion of the ram for rotatably supporting a spindle having a tool mounted thereon, and a table fixed on the front portion of the frame for mounting a workpiece thereon. The machine tool is driven to move in the individual feed directions along the X- Y- and Z-axes by linear motors. Moreover, the vertical gantry is guided on two sides, upper and lower sides, with respect to the frame and is driven by the linear motors. A stator (static element) and a mover (moving element) of the linear motor are arranged on the frame in vertically symmetric manner so that the attraction force of the stator acting on the mover both in the upper and lower linear motors may be vertically offset from each other.

A second prior art available for realizing the aforementioned requirements is a machine tool as disclosed in Unexamined Japanese Patent Publication (Kokai) No. 9-262727. The machine tool includes a vertical bed in the shape of a rectangular frame having a through opening at its center, as viewed in front view, an X-slide in the shape of a rectangular frame shape made movable on the front side of the vertical bed in a direction along the X-axis and having a through opening at its center, as viewed in front view, a Y-slide adapted to be movable in a direction along the Y-axis while being supported and guided in the through opening of the X-axis slide, a Z-axis slide adapted to be movable in a direction along the Z-axis while being supported and guided by the Y-axis slide, a spindle head disposed at the front end portion of the Z-axis slide for rotatably supporting a spindle having a tool mounted thereon, and a table fixed on the front portion of the vertical bed for mounting a workpiece thereon. The machine tool is guided in the feed directions along the X- Y- and Z-axes individually by a pair of rail-shaped guides and is driven by a pair of linear motors.

Further, a third available prior art is a workpiece pallet exchange method, as disclosed in Unexamined Japanese Patent Publication (Kokai) No. 60-29261. The machine tool with a pallet changer, as disclosed therein, includes a machine body for machining a workpiece by relative movement along the X- Y- and Z-axes between a spindle head for rotatably supporting a spindle having a tool mounted thereon and a table for mounting the workpiece thereon, and a pallet changer disposed adjacent to the machine body for giving and receiving the pallets to/from the table to exchange them. The pallet changer has a plurality of surfaces for mounting pallets thereon and is constructed to rotate about a horizontal rotational axis and thereby to index a pallet change position, a standby position or a workpiece cleaning position.

Further, a fourth available prior art is a pallet changer, as disclosed in Unexamined Japanese Patent Publication (Kokai) No. 10-128640. This shuttle type pallet changer, after the desired machining has been finished, carries a pallet having a machined workpiece mounted thereon from the table of a machine tool to a pallet stocker, and then carries a pallet having a new setup workpiece mounted thereon from the pallet stocker to the table of the machine tool. At the mounting/demounting of the workpiece on/from the pallet, an angle plate mounted on the pallet is turned by 90 degrees to a horizontal state, and the machined workpiece is removed by a crane or the like. After this, the new setup workpiece is mounted on the angle plate.

Further, a fifth available prior art is an aerial carrying apparatus, as disclosed in Unexamined Japanese Utility Model Publication (Kokai) No. 60-120751. This carrying apparatus includes a moving device movable in a longitudinal direction of carrying rails disposed over a machine tool, in a vertical direction and in direction perpendicular to the former directions, and a holding device suspended from the moving device for holding a pallet having a workpiece mounted thereon. The pallet held by the holding device is carried to a predetermined position in the machine tool.

Further, a sixth available prior art is an automatic machining apparatus, as disclosed in Unexamined Japanese Utility Model Publication (Kokai) No. 4-57358. This automatic machining apparatus is provided with a carriage and a hoist crane for carrying a workpiece between a three-dimensional storage disposed in front of a machine tool and a carrying-in table serving as a setup station as well as between the three-dimensional storage and a workpiece changer. If the carriage breaks down, the workpiece is carried by the hoist crane between the three-dimensional storage and the carrying-in table serving as the setup station and between the three-dimensional storage and the workpiece changer of the machine tool.

In a large-sized machine tool for machining large parts such as a machine tool for machining aircraft parts, a workpiece mounting table for a large workpiece to be mounted is generally stationary during the machining process. Therefore, a spindle, which has a tool mounted thereon and can rotate, is provided with the orthogonal feed means and the rotational feed means thereby to allow for the movement in the directions along the X-axis, the Y-axis and the Z-axis and the rotation along the A-axis, the B-axis and the C-axis. Further, such a machine tool generally has a horizontal-type spindle and also has relatively long strokes along the X-axis and the Y-axis. Therefore, a high large-sized column is guided to move in the horizontal direction along the X-axis on a bed so that a spindle head rotatably supporting the spindle can be moved in the direction along the Y-axis on the column.

As one of methods for solving the above-described problem that the mover of the spindle support structure is large and heavy, it is possible that a base is designed to have a frame-shaped structure and to be provided with X-axis guides at two portions, upper and lower portions of the base, as in the first and second prior arts, so that a X-axis slider similarly designed to have a frame-shaped structure can be guided to move along the upper and lower guides. With such a guiding and driving at the two upper and lower portions, the mover is not cantilevered. Therefore, the rigidity required for the mover can be lowered thereby to ensure the necessary rigidity even in a lighter mover. If the linear motors are used as means for feeding/driving the mover, a high-speed feed can also be achieved.

However, there arises a new problem which is particular to the machine tool requiring a longer X-axis stroke than that of the typical machine tool. As the X-axis stroke becomes longer, a telescopic type or winding type movable cover for covering the guides and the feed mechanism in the direction along the X-axis has to become longer in order to provide a protection against chips produced by machining the workpiece. As a result, the movable cover can easily break down.

The first and second prior arts do not indicate such a problem because they are not directed to the machine tool having a relatively long X-axis stroke. Further, although the X-axis slider is lightened, the Y-axis stroke is also increased in length to exert certain degree of load on the X-axis guides. This can raise another problem that safety has to be ensured for the lifetime of the X-axis guides.

As a result of the use of the large-sized workpiece, it takes a long time to perform the setup operations, i.e., to mount the workpiece on the table, to remove chips from the workpiece after it is machined, and to remove the workpiece from the table after machined. During the setup operations, therefore, the machine tool is interrupted to raise a problem that the operating rate of the machine drops. Further, the mover (or the spindle head and the columns) to move in the direction along the X-axis has to be increased in size and weight. This can raise problems that the high-speed feed is difficult, and that maintaining the positioning precision in the direction along the X-axis at a high level is difficult due to the frictional resistance caused by the weight of the mover moving in the direction along the X-axis.

One of solutions for solving the problem of the drop in the working efficiency and the operating rate of the machine due to the long time required for the setup is to attach a pallet changer to the machine tool, as exemplified in the third prior art. If a large workpiece is to be handled, however, a large installation space is required and consequently, the construction has to be enlarged. This causes another problem in that the necessary cost is considerably high.

In order to improve the efficiency and safety of the setup operations by carrying out the setup operations with the workpiece mounting surfaces of the pallet being in horizontal state, the fourth prior art can be employed. In the fourth prior art, however, the pallet changer and the pallet stocker are merely arranged in a plane. Therefore, in case that the pallet having the large workpiece mounted thereon is changed, the fourth prior art raises a problem in that the area for installing the machine tool is seriously enlarged.

Further, in the fourth prior art, it is sequentially necessary, after the desired machining, to carry the pallet having the machined workpiece mounted thereon from the table of the machine tool to the pallet stocker by the shuttle type pallet changer, to move the table of the machine tool to a position facing another pallet stocker and to carry the pallet having the new setup workpiece mounted thereon from the pallet stocker to the table of the machine tool by the pallet. Therefore, the fourth prior art has another problem in that it takes a long time to exchange the pallets.

According to the fourth prior art, unless the pallet having the machined workpiece mounted thereon is carried out of the table of the machine tool, the pallet having the new setup workpiece mounted thereon cannot be carried to the table of the machine tool. During this process, therefore, the machining process in the machine tool has to be stopped. As a result, this can raise a problem that the whole time necessary for one machining process is longer.

Further, in the fourth prior art, the pallet having the workpiece mounted thereon is carried in the plane after a desired machining process. Therefore, the operation of checking the machined workpiece by the operator is accompanied with a serious danger, and the access to the workpiece is deteriorated. This results in problems of a decreased operating efficiency in the checking and cleaning operations for the machined workpiece and impossible direct setup operation.

From these problems, it is deal for saving the space required for the machine tool to carry the pallet not in a plane but in a three-dimensional space.

By utilizing the fifth prior art, therefore, the pallet is not carried in the plane, as in the fourth prior art, but can be carried in the space above the machine tool. In this case, however, the positioning of the pallet held in the holding device suspended from the moving device is problematic. This is because an object suspended from a moving device may rock during the movement, thereby to make it seriously difficult to position the object at a predetermined position.

Further, in the fifth prior art, the suspended pallet is positioned with respect to the machine tool by the positioning means disposed on the machine tool. Therefore, it is necessary to provide the positioning means on the machine tool, and this results in the increased cost of the machine tool. Even if the pallet is positioned on the machine tool, the pallet stocker or the like also has to be provided with the positioning means thereby to raise a problem that the construction is seriously complicated.

In the sixth prior art, as in the fifth prior art, the pallet is carried in the space above the machine tool, and the hoist crane is especially used for carrying the pallet. The positioning of the suspended pallet is an important target, as described hereinbefore. In the sixth prior art, however, no countermeasure has been provided for positioning the workpiece suspended by the hoist crane. Therefore, a problem is that it is seriously difficult to carry the pallet to the predetermined position and to position it precisely.

From the above discussion, it can be said that it is a requirement not only to carry the pallet spatially for saving the space of the machine tool but also to position the pallet suspended and held simply and reliably at the predetermined position and to achieve a highly efficient and precise machining.

DISCLOSURE OF THE INVENTION

An object of the present invention is to solve the above-described problems and to provide a machine tool system, and a method for exchanging pallets therein, which allow for the high-speed and precise machining a large-sized workpiece and which facilitate the setup process for the large-sized workpiece.

Another object of the present invention is to provide a machine tool system, and a method for exchanging pallets therein, for machining a large-sized workpiece in a high operating rate of the machine.

Another object of the present invention is to provide a machine tool system, and a method for exchanging pallets therein, which can make an installation area compact.

Another object of the present invention is to provide a machine tool system, and a method for exchanging pallets therein, which allow for a highly efficient machining by reducing the time for exchanging the workpieces.

Another object of the present invention is to provide a machine tool system, and a method for exchanging pallets therein, which can improve the access to the workpiece and allow for a direct setup operation.

Another object of the present invention is to provide a machine tool system, and a method for exchanging pallets therein, which can perform the operation of checking the machined workpiece safely and easily even during the machining of the workpiece.

Another object of the present invention is to provide a machine tool system, and a method for exchanging pallets therein, for a large-sized workpiece, which can handle chips easily.

In view of the aforementioned objects, the present invention provides a machine tool which includes a spindle support structure having a spindle movable in directions along the X-axis, the Y-axis and the Z-axis, and a workpiece mounting table disposed in opposed relation to the spindle support structure and having two opposed pallet mounting surfaces, which workpiece mounting table is supported to allow the pallet mounting surface to be rotationally indexed in a desired position. This machine tool can machine the workpiece with a pallet being positioned on a pallet a vertical state, after mounting the pallet on one pallet mounting face of the workpiece mounting table in a horizontal state.

According to the present invention, there is provided a machine tool for machining a workpiece mounted on a workpiece mounting table by moving a spindle having a tool mounted thereon in directions along the X-axis, the Y-axis and the Z-axis with respect to the workpiece, which includes a spindle support structure including a spindle head rotatably supporting the spindle and arranged to be movable in the directions along the X-axis, the Y-axis and the Z-axis on a base adapted to be located on a floor surface; a workpiece support structure disposed in opposed relation to said spindle support structure and including a workpiece mounting table having two opposed pallet mounting surfaces and pallet securing means arranged thereon, the workpiece mounting table supported to allow for rotational indexing about a horizontal axis extending in the direction along the X-axis; and rotationally indexing means for turning the workpiece mounting table of the workpiece support structure by 90 degrees or 180 degrees to allow the two opposed pallet mounting surfaces to be positioned in an upwardly directed horizontal position or a transversely directed vertical position.

The rotationally indexing means may be constructed to comprise an indexing motor for rotationally indexing the workpiece mounting table of the workpiece support structure, first positioning means for positioning the workpiece mounting table by engaging with the rotating shaft of the workpiece mounting table of the workpiece support structure, a bracket mounted on the workpiece mounting table of said workpiece support structure, and second positioning means for positioning the workpiece mounting table of the workpiece support structure by engaging with the bracket.

The spindle support structure may be constructed to comprise a base adapted to be located on the floor surface and having guides extending in the direction along X-axis on the upper and lower portions thereof, an X-axis slider guided along the guides on the upper and lower portions of the base to move from side to side in the direction along the X-axis, a Y-axis slider guided on the X-axis slider to move upwardly and downwardly in the direction along the Y-axis, a Z-axis slider guided on the Y-axis slider to move forwardly and backwardly in the direction along the Z-axis, and a spindle head fixedly mounted on the Z-axis slider or mounted to be rotatable in at least one of directions along the A-axis, the B-axis and the C-axis.

The base of the spindle support structure may be configured of an extended base having a plurality of base units coupled to each other along the X-axis, the base unit having a predetermined X-axis unit length, and the workpiece support structure may be configured of an extended workpiece support structure having a plurality of workpiece support structure units coupled to each other along the X-axis with the horizontal axes thereof aligned with each other, the workpiece support structure unit having a predetermined X-axis unit length.

The X-axis slider of the spindle support structure may be driven in the direction along the X-axis by linear motors disposed along the guides on the upper and lower portions of the base, respectively, and the liner motor may include a stator and a mover arranged on the base and the X-axis slider, respectively, in opposed relation to each other so that the attraction force of the stator acting on the mover reduces the load in the gravitational direction exerted on the guides of the X-axis slider.

The base of the spindle support structure may have longitudinal spaces extending in the direction along the X-axis and opening downwardly in the upper and lower portions of the base, respectively, and each of longitudinal spaces accommodates therein a guide for guiding and supporting the X-axis slider and X-axis feed means for moving the X-axis slider in the direction along the X-axis.

According to the present invention, there is also provided a machine tool for machining a workpiece mounted on a workpiece mounting table by moving a spindle having a tool mounted thereon in directions along the X-axis, the Y-axis and the Z-axis, which includes a spindle support structure including a spindle head rotatably supporting the spindle and arranged to be movable in the directions along the X-axis, the Y-axis and the Z-axis on a base adapted to be located on a floor surface; a workpiece support structure disposed in opposed relation to the spindle support structure and including a workpiece mounting table having two opposed pallet mounting surfaces and pallet securing means arranged thereon, the workpiece mounting table supported to allow for rotational indexing about a horizontal axis extending in the direction along X-axis; rotationally indexing means for turning the workpiece mounting table of the workpiece support structure by 90 degrees or 180 degrees to allow the two opposed pallet mounting surfaces individually to be positioned in an upwardly directed horizontal position and a transversely directed vertical position; and chip discharge means interposed between the spindle support structure and the workpiece support structure for discharging chips produced in the machining area to the outside of the machining area.

According to the present invention, there is also provided a machine tool for machining a workpiece mounted on a workpiece mounting table by moving a spindle having a tool mounted thereon in directions along the X-axis, the Y-axis and the Z-axis with respect to the workpiece, which includes a spindle support structure including a spindle head rotatably supporting the spindle and arranged to be movable in the directions along the X-axis, the Y-axis and the Z-axis on a base adapted to be located on a floor surface; a workpiece support structure disposed in opposed relation to the spindle support structure and including a workpiece mounting table having two opposed pallet mounting surfaces and pallet securing means arranged thereon, the workpiece mounting table supported to allow for rotational indexing about a horizontal axis extending in the direction along the X-axis; a pallet stocker spaced apart from the workpiece support structure for a pallet having the workpiece mounted thereon to be placed; and pallet changing means for transferring and carrying the pallet between the pallet mounting surface of the workpiece mounting table of the workpiece support structure in an upwardly directed horizontal position and the top surface of the pallet stocker, by holding the pallet in a suspended manner and by moving along guiding means in the horizontal direction and in the vertical direction.

According to the present invention, there is also provided a machine tool for machining a workpiece mounted on a workpiece mounting table by moving a spindle having a tool mounted thereon in directions along the X-axis, the Y-axis and the Z-axis with respect to the workpiece, which includes a spindle support structure including a spindle head rotatably supporting the spindle and arranged to be movable in the directions along the X-axis, the Y-axis and the Z-axis on a base adapted to be located on a floor surface; a workpiece support structure disposed in opposed relation to the spindle support structure and including a workpiece mounting table having two opposed pallet mounting surfaces and pallet securing means arranged thereon, the workpiece mounting table supported to allow for rotational indexing about a horizontal axis extending in the direction along the X-axis; a pallet stocker spaced apart from the workpiece support structure for a pallet having the workpiece mounted thereon to be placed; pallet changing means for transferring and carrying the pallet between the pallet mounting surface of the workpiece mounting table of the workpiece support structure in an upwardly directed horizontal position, and the top surface of the pallet stocker, by holding the pallet in a suspended manner and by moving along guiding means in the horizontal direction and in the vertical direction; a three-dimensional pallet magazine spaced apart from the pallet stocker and configured to be able to store a plurality of pallets in a three-dimensional manner; and pallet transferring means interposed between the pallet stocker and the three-dimensional pallet magazine and arranged to be movable in the horizontal direction and in the vertical direction for transferring the pallets between the pallet stocker and the three-dimensional pallet magazine.

According to the present invention, there is also provided a machine tool for machining a workpiece mounted on a workpiece mounting table by moving a spindle having a tool mounted thereon in directions along the X-axis, the Y-axis and the Z-axis with respect to the workpiece, which includes a plurality of spindle support structures including a spindle head rotatably supporting the spindle and arranged to be movable in the directions along the X-axis, the Y-axis and the Z-axis on a base adapted to be located on a floor surface; a plurality of workpiece support structures disposed individually in opposed relation to the plurality of spindle support structures, each of the workpiece support structures including a workpiece mounting table having two opposed pallet mounting surfaces and pallet securing means arranged thereon, the workpiece mounting table supported to allow for rotational indexing about a horizontal axis extending in the direction along the X-axis; a plurality of pallet stockers individually spaced apart from the plurality of workpiece support structures for a pallet carrying having the workpiece mounted thereon to be placed; a plurality of pallet changing means for transferring and carrying the pallet between the pallet mounting surface of the workpiece mounting tables of the workpiece support structures in an upwardly directed horizontal position and the top surface of the pallet stockers individually spaced apart from the plurality of workpiece support structures, by holding the pallet in a suspended manner and by moving along guiding means in the horizontal direction and in the vertical direction; a three-dimensional pallet magazine spaced apart from the plurality of pallet stockers and configured to be able to store a plurality of the pallets in a three-dimensional manner; and pallet transferring means interposed between the plurality of pallet stockers and the three-dimensional pallet magazine and arranged to be movable in the horizontal direction and in the vertical direction for transferring the pallets between the plurality of pallet stockers and the three-dimensional pallet magazine.

According to the present invention, there is also provided a machine tool for machining a workpiece mounted on a workpiece mounting table by moving a spindle having a tool mounted thereon in directions along the X-axis, the Y-axis and the Z-axis with respect to the workpiece, which includes a spindle support structure including a spindle head rotatably supporting the spindle and arranged to be movable in the directions along the X-axis, the Y-axis and the Z-axis on a base adapted to be located on a floor surface; a workpiece support structure spaced away from the spindle support structure and including a workpiece mounting table having one pallet mounting surface and pallet securing means arranged thereon, the workpiece mounting table supported to allow for rotational indexing about a horizontal axis extending in the direction along the X-axis; rotationally indexing means by turning the workpiece mounting table of the workpiece support structure by 90 degrees or 180 degrees to allow the one pallet mounting surface to be positioned in an upwardly directed horizontal position and a transversely directed vertical position; and chip discharge means interposed between the spindle support structure and the workpiece support structure for discharging chips produced in the machining area, to the outside of the machining area.

According to the present invention, there is also provided a machine tool for machining a workpiece mounted on a workpiece mounting table by moving a spindle having a tool mounted thereon in directions along the X-axis, the Y-axis and the Z-axis with respect to the workpiece, which includes a spindle support structure including a spindle head rotatably supporting the spindle and arranged to be movable in the directions along the X-axis, the Y-axis and the Z-axis on a base adapted to be located on a floor surface; a workpiece support structure spaced apart from the spindle support structure including a workpiece mounting table having one pallet mounting surface and pallet securing means arranged thereon, the workpiece mounting table supported to allow for rotational indexing about a horizontal axis extending in the direction along the X-axis; a pallet stocker spaced apart from the workpiece support structure for a pallet having the workpiece mounted thereon to be placed; and pallet changing means for transferring and carrying the pallet between the pallet mounting surface of the workpiece mounting table of the workpiece support structure in an upwardly directed horizontal position and the top surface of the pallet stocker, by holding the pallet in a suspended manner and by moving along guiding means in the horizontal direction and in the vertical direction.

According to the present invention, there is further provided a pallet carrying system of a machine tool for transferring and carrying a pallet having a workpiece mounted thereon between a workpiece mounting table and a pallet stocker in the machine tool, which includes the workpiece mounting table of the machine tool having two pallet mounting surfaces and supported to allow for rotational indexing; a pallet stocker spaced apart from the workpiece mounting table for a pallet to be placed; and pallet changing means for transferring and carrying the pallet between the pallet mounting surface of the workpiece mounting table in an upwardly directed horizontal position and the upper surface of the pallet stocker, by holding the pallet in a suspended manner and by moving along guiding means in the horizontal direction and in the vertical direction.

According to the present invention, there is also provided a pallet carrying system of a machine tool for transferring and carrying a pallet having a workpiece mounted thereon between a workpiece mounting table and a pallet stocker in the machine tool, which includes the workpiece mounting table of the machine tool having two pallet mounting surfaces and supported to allow for rotational indexing; a pallet stocker spaced apart from the workpiece mounting table for a pallet to be placed; pallet changing means for transferring and carrying the pallet between the pallet mounting surface of the workpiece mounting table in an upwardly directed horizontal position and the top surface of the pallet stocker, by holding the pallet in a suspended manner and by moving along guiding means in the horizontal direction and in the vertical direction; a three-dimensional pallet magazine spaced apart from the pallet stocker and configured to be able to store a plurality of pallets in a three-dimensional manner; and pallet transferring means interposed between the pallet stocker and the three-dimensional pallet magazine and arranged to be movable in the horizontal direction and in the vertical direction for transferring the pallets between the pallet stocker and the three-dimensional pallet magazine.

According to the present invention, there is further provided a method of exchanging pallets in a machine tool including a spindle support structure having a spindle movable in directions along the X-axis, the Y-axis and the Z-axis with respect to the workpiece, and a workpiece mounting table which is disposed in opposed relation to the spindle support structure and which has two pallet mounting surfaces and is supported to allow the pallet mounting surfaces to be rotationally indexed in a desired position, which includes steps of (a) mounting a pallet having a workpiece mounted thereon on one pallet mounting surface of the workpiece mounting table being in a horizontal state; (b) machining the workpiece with the pallet being positioned in a vertical state; (c) after the workpiece is machined, mounting another pallet having another workpiece mounted thereon on the other pallet mounting surface of the workpiece mounting table being in the horizontal state, after the workpiece is machined; (d) demounting the pallet having the machined workpiece mounted thereon from the workpiece mounting table with the pallet being in the horizontal state; and (e) machining the another workpiece with the another pallet having the another workpiece mounted thereon being positioned in the vertical state.

With such constructions as described above, in the spindle support structure, the X-axis slider, i.e., one of the components of the mover movable with respect to the stationary base, is guided and supported by the upper and lower edge portions, so that forces (i.e., a thrust force and a supporting force) acting on the X-axis slider are applied to substantially symmetric portions of the X-axis slider. Unlike the case of the cantilever support in the machine tool of the prior art, therefore, the X-axis slider is not required to be reinforced by the structural member in order to prevent the bending and deflection of a distal end portion, as caused by the rotation moment, so that the structure can be lightened and moved at a high speed. In the machine tool, especially a machine tool for machining an large-sized workpiece, the stroke along the X-axis is generally elongated. Therefore, making the mover at a higher speed in the X-axis direction significantly contributes to an increased machining speed for the whole machine tool and a reduced operating time thereby to improve an efficiency in the maching process.

Moreover, provision of the workpiece mounting table supported to allow for rotational indexing about the horizontal axis extending in the direction along the X-axis allows the workpiece mounting surface to be directed upwardly or preferably horizontally. As a result, the risk of the workpiece falling down from the workpiece mounting surface can be eliminated and the safety of the worker can be ensured. This facilitates the setup process.

Moreover, one of the two opposed pallet mounting surfaces of the workpiece mounting surface can be positioned in the horizontal state or in the vertical state by the rotational indexing means. Therefore, the machined workpiece can be set up and transferred/carried while a new workpiece is being machined, thereby to improve the operating rate of the machine and to shorten the time required for exchanging the workpieces to achieve a highly efficient machining process.

Further, the pallet having the workpiece mounted thereon is carried over the operator or worker. This can make the area for installing the machine compact and improve the access of the worker to the workpiece thereby to make a direct setup operation possible.

Moreover, the chip discharge means is intended to lighten the chip removing operation by discharging chips and cutting fluid, which are produced in the machining area and fall naturally, to a predetermined place. The chip discharge means can separate the spindle support structure from the workpiece support structure to facilitate the manufacture and installation of the large-sized machine tool so that the spindle support structure and the workpiece support structure can be modularized.

By combining the effects achieved by the constructions described above, the machine tool and the method of exchanging pallets according to the present invention can reduce the time required for the setup process and the machining process thereby to improve the efficiency of the whole machining operation.

Comparing the aforementioned prior arts to the present invention, the first and second prior arts disclose the machine tool having a relatively short X-axis stroke, unlike the machine tool according to the present invention having a relatively long X-axis stroke for maching the large-sized work workpiece, and therefore, fails to solve any of the problems such as the malfunction of the movable cover and the lifetime of the X-axis guide. In the third and fourth prior arts, the pallet changer and the pallet stocker are merely arranged in the plane, while the machine tool apparatus according to the present invention conveys the pallet in the air so that it is free from the problem of the larger area for installing the machine. In the fifth prior art the positioning of the pallet carried in the air with respect to the machine is carried out by the machine, and in the sixth prior art, the pallet is merely carried in a suspended manner by the hoist crane. On the other hand, the machine tool according to the present invention is provided on the pallet changer with means for positioning the pallet with respect to the machine so that the structure of the machine can be simplified without the least modification of the machine tool.

BRIEF DESCRIPTION OF THE DRAWINGS

The above and other features and advantages of the present invention will become apparent from the following detailed description of the invention taken in conjunction with the accompanying drawings, wherein:

FIG. 11 is a perspective view showing the workpiece support structure, a pallet stocker and pallet changing means of the machine tool according to the present invention, and illustrates the state during the machining process for the workpiece;

FIG. 12 is a perspective view showing the workpiece support structure, the pallet stocker and the pallet changing means of the machine tool according to the present invention, and illustrates the state during the exchanging of pallets;

FIG. 13 is a perspective view showing the workpiece support structure, the pallet stocker and the pallet changing means of the machine tool according to the present invention, and illustrates the state during the carrying of the pallets to the pallet stocker;

FIG. 14 is a perspective view showing the workpiece support structure, the pallet stocker, the pallet changing means, a three-dimensional pallet magazine and pallet transferring means;

BEST MODE FOR CARRYING OUT THE INVENTION

Figure 1:
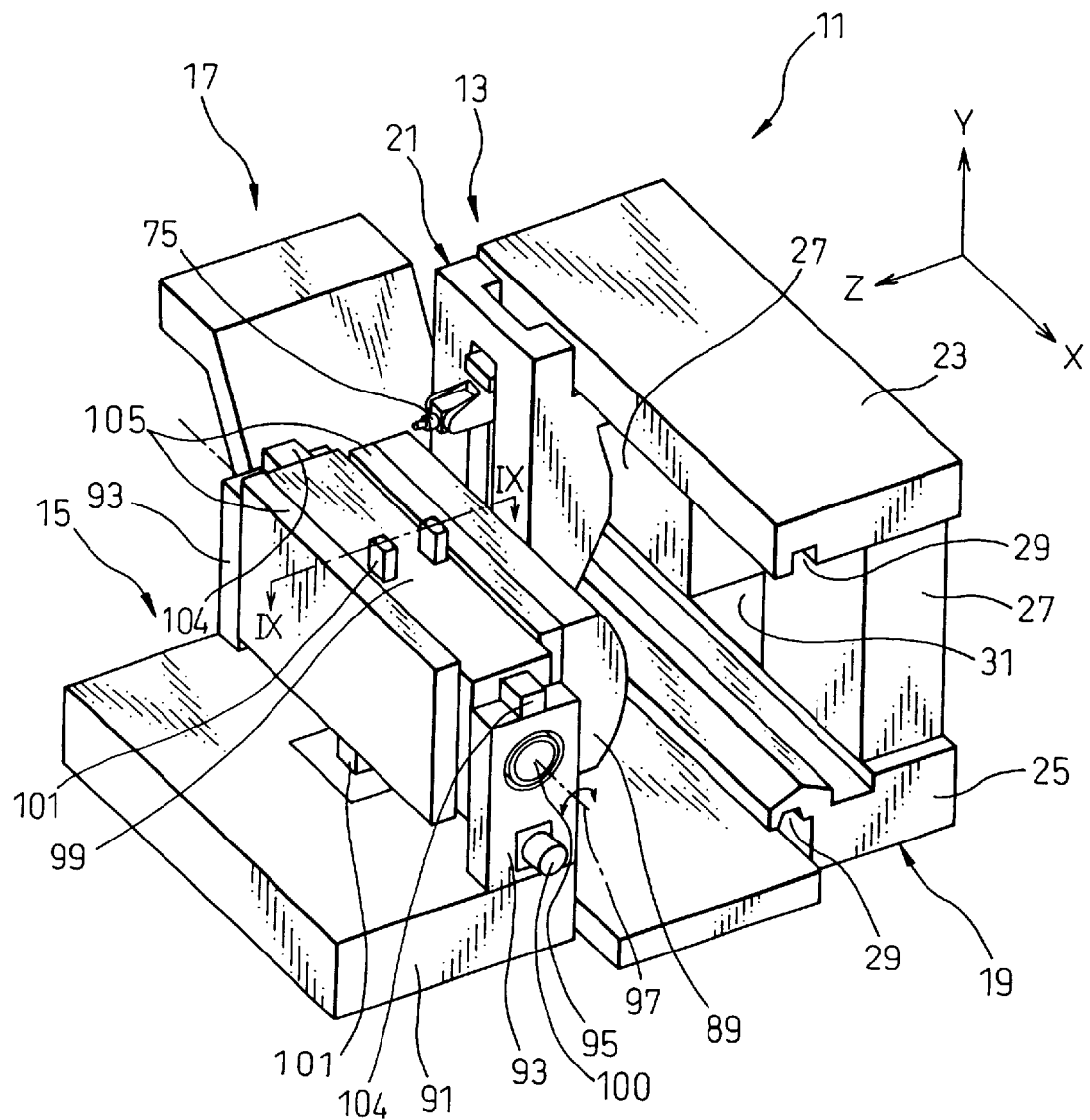
FIG. 1 is a perspective view showing a general configuration of a machine tool according to the present invention.
Figure 2:
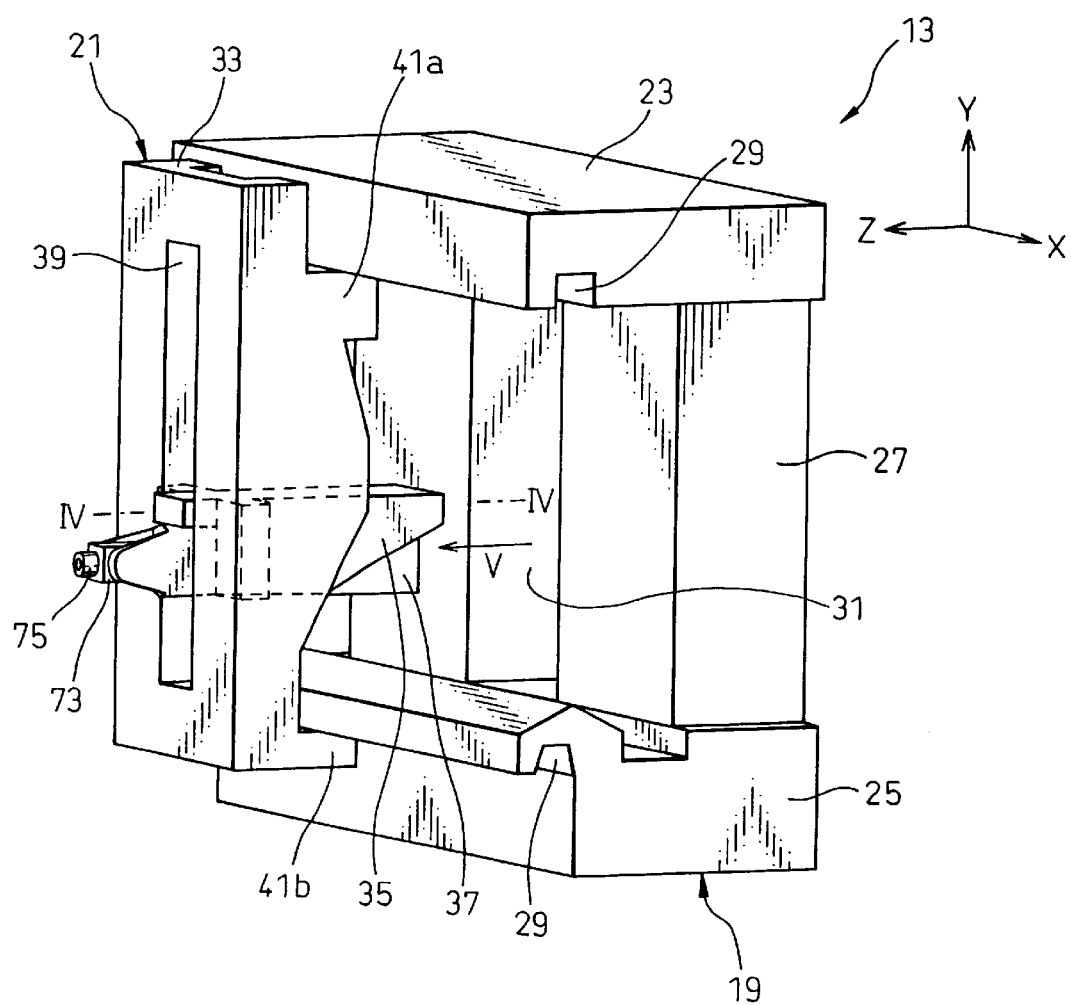
FIG. 2 is a perspective view of a spindle support structure of the machine tool shown in FIG. 1.

FIG. 1 is a perspective view showing a general configuration of a machine tool 11 according to the present invention. The machine tool 11 shown in FIG. 1 is configured with a spindle support structure 13, a workpiece support structure 15 and a chip discharge means 17 interposed between the spindle support structure 13 and the workpiece support structure 15. FIG. 2 is a perspective view of the spindle support structure 13 shown in FIG. 1.

In the following description, it should be noted that, unless otherwise specified, the front side of the machine tool refers to a side performing a machining function, and the rear side of the machine tool refers to the opposite side far away from the side performing the machining function. It should also be noted that, as shown in FIG. 1, the longitudinal direction of the machine tool is defined as a direction along an X-axis, the direction extending vertically is defined as a direction along a Y-axis, and the direction perpendicular to the X-axis and the Y-axis is defined as a direction along a Z-axis.

Referring to FIGS. 1 and 2, the spindle support structure 13 includes a base 19 located on the floor surface and a movable body 21. The base 19 further includes a beam 23 at the top thereof, a bed 25 at the bottom thereof, and a column 27 on the rear side thereof which connects the beam 23 and the bed 25. Therefore the base 19 has a C-shape in section as viewed from the side thereof. Each of the beam 23 and the bed 25 is formed with a groove-shaped longitudinal space 29 extending at the front portion thereof in the direction along the X-axis. Preferably, the groove-shaped longitudinal space 29 is formed to open downwardly as shown in FIGS. 1 and 2.

The column 27 connects the beam 23 and the bed 25 and reinforces a rigidity of the beam 23 by supporting the beam 23 not to be deformed in the direction along the X-axis. However, as long as the beam 23 can maintain a sufficient rigidity to cause no deformation in the direction along the X-axis, the column 27 may be formed with an opening 31, as shown in FIGS. 1 and 2, or be constituted of a plurality of post members spaced apart from each other. The provision of the opening 31 can reduce the weight of the spindle support structure 13. The opening 31 is of course not required in the case where a large rigidity is required.

Referring to FIG. 2, the movable body 21 includes an X-axis slider 33 guided to be movable from side to side in the direction of the X-axis along the longitudinal space 29 of the base 19, a Y-axis slider 35 guided to be movable upwardly and downwardly in the direction of the Y-axis on the X-axis slider 33, and a Z-axis slider 37 guided to be movable forwardly and backwardly in the direction of the Z-axis on the Y-axis slider 35.

The X-axis slider 33 is formed into a frame shape with an elongate through opening 39 extending along the direction of the Y-axis at the center in front view, and has extensions 41a, 41b projecting into the upper and lower grooved-shaped longitudinal spaces 29 of the base 19 from the upper and lower portions thereof, respectively. The X-axis slider 33 is moved along the longitudinal space 29 of the extensions 41a, 41b by X-axis feed means. The X-axis feed means can be, for example, a combination of a motor and a ball screw or a linear motor.

Figure 3:
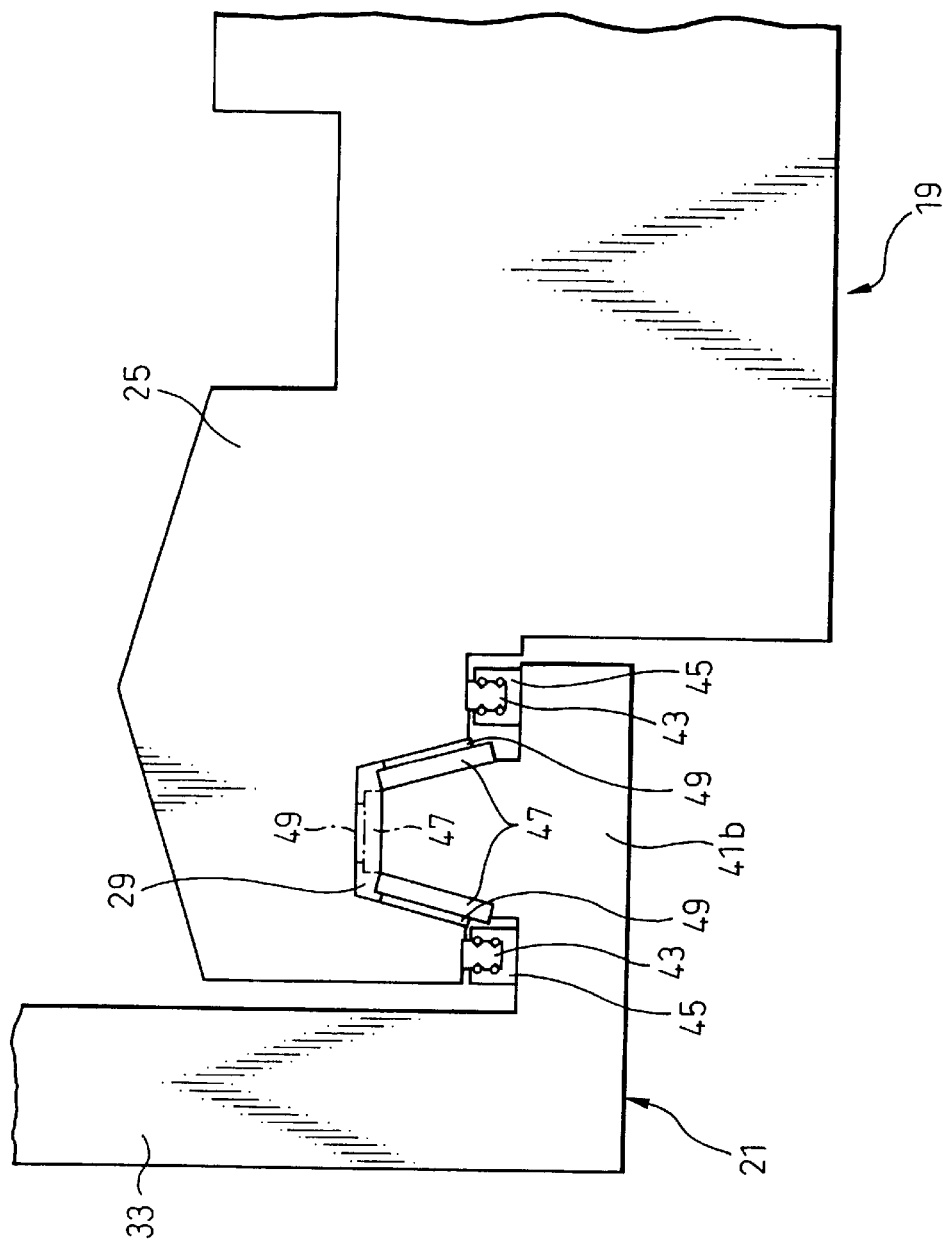
FIG. 3 is a side elevation of a lower front end portion of a base of the spindle support structure shown in FIG. 2.

Referring to FIG. 3 showing a side view of the front end portion of the lower portion (bed 25) of the base 19 shown in FIG. 2, the bed 25 is provided at the front end portion with two rail-shaped X-axis guides 43 extending in parallel in the direction of the X-axis with the opening area of the longitudinal space 29 interposed therebetween. The extension 41b of the X-axis slider 33 is provided with a plurality of X-axis slide elements 45 spaced apart from each other in the direction along Z-axis and having rolling members adapted to engage with the X-axis guides 43 so that the X-axis slider 33 can be guided in the direction along the X-axis by means of the X-axis guide 43 and the X-axis slide elements 45.

On the other hand, one or more movers (moving elements) 47 of a linear motor, i.e., X-axis feed means, are disposed in the forward end portion of the extension 41b extending from the extension 41b into the longitudinal space 29 of the bed 25, and one or more stators 49 of the linear motor are disposed in opposed relation to the movers 47 on the surface of the bed 25 surrounding the longitudinal space 39.

By providing the X-axis guides 43 extending in parallel with the opening area of the longitudinal space 29 interposed therebetween, the extension 41b need not be formed as a cantilevered portion, thereby ensuring the rigidity required for the extension 41b.

Similarly, X-axis guides 43 and X-axis slide elements 45 as well as one or more movers 47 and one or more stators 49 of a linear motor are disposed on the extension 41a in the upper portion of the X-axis slider 33 and on the surface of the beam 23 surrounding the longitudinal space 29 formed in the beam 23 at the top of the base 19, respectively.

In the aforementioned embodiment, the two X-axis guides 43 are disposed with the opening area of the longitudinal space 29 interposed therebetween, although a single X-axis guide can replace them. A guide of another type such as a sliding surface can be also used in place of the rail-shaped X-axis guide 31. Further, a combination of a motor and a ball screw can be used as the X-axis feed means in place of the linear motor.

This configuration allows the movable body 21 to move in the direction of the X-axis on the base 19 by being driven by means of the X-axis feed means arranged in the longitudinal spaces 29 while being guided and supported by the X-axis guides 43 arranged on the beam 23 and the bed 25.

Since the X-axis slider 33 of the movable body 21 moving on the base 21 is supported and guided on two sides at the upper and lower portions, the moment of rotation is not exerted on the X-axis slider 33 like a cantilevered X-axis slider supported and guided on a single side. Therefore, the required rigidity for the X-axis slider 33 can be easily ensured while, at the same time, reducing the weight of the X-axis slider 33. As a result, a reduced weight of the movable body 21 is achieved, so that the movable body 21 can move at high speed in the direction of the X-axis.

Further, since the longitudinal spaces 29 are open downwardly and accommodate therein a guiding and driving mechanism including the X-axis guides 43 and the X-axis feed means, the guiding and driving mechanism for the X-axis cannot be easily intruded into by the chips and dust produced in the machining area or by cutting fluid.

If the groove-shaped longitudinal spaces 29 formed in the front end portions of the bed 25 and the beam 23 are open downwardly, it is advantageous that the width of each of the longitudinal spaces 29, as shown in FIG. 3, expands progressively and downwardly so that the cross section thereof is of a trapezoidal shape having symmetric side slopes, and that the forward end portions of the extensions 41a, 41b of the X-axis slider 33 located in the longitudinal spaces 29 are also of a trapezoidal shape. In that case, the stators 49 of the linear motor are arranged on the extensions 41a, 41b along the two side slopes of the trapezoidal forward end portions thereof and the movers 47 of the linear motor are arranged on the X-axis slider 33 in an opposed relation to the stator 49.

When the movers 47 and the stators 49 of the linear motor are arranged in this way on the symmetric slopes of the longitudinal spaces 29 and the forward end portions of the extensions 41a, 41b, the attraction force acting between the movers 47 and the stators 49 of the linear motor causes a force in the opposite direction to the gravity to be exerted on the X-axis slider 33. Thus, the force in the opposite direction to the gravitational force exerted on the X-axis slider 33 is exerted on the X-axis slider 33, so that the load exerted by the X-axis slider 33 on the X-axis guide 43 located on the bed 25 through the X-axis slide elements 45 arranged on the X-axis slider 33 is reduced. This reduces the friction resistance between the X-axis slide elements 45 and the X-axis guides 43, thereby making it possible to move the X-axis slider 33 at higher speed. Further, the positioning precision is improved.

By changing the angle of the slope of the inclined surface for mounting the linear motor thereon in the longitudinal space 29 and the forward end portions of the extensions 41a, 41b, the degree of the force reducing the gravitational force exerted on the X-axis slide members 45 can be adjusted without changing the driving force of the linear motor in the direction of the X-axis. Thus, this makes it possible to set the force acting on the X-axis guides 43 from the X-axis slider 33 through the X-axis slide elements 45 at an appropriate value and can lengthen the service life of the X-axis slide elements 45.

Alternatively, like the longitudinal space 29 of the beam 23 shown in FIGS. 1 and 2, each of the longitudinal spaces 29 of the bed 25 and the beam 23 may be formed into a shape of a rectangular section and each of the forward end portions of the extensions 41a, 41b of the X-axis slide 33, correspondingly, may have a rectangular shape in section. In such a case, the stators 49 of the linear motor are arranged along the top surface of the longitudinal space 29, and the movers 47 of the linear motor are arranged on the X-axis slider 33 in opposed relation to the stators 49. Even in this arrangement, the force in the opposite direction to the gravitational force exerted on the X-axis slider 33 is exerted on the X-axis slider 33. Therefore, this arrangement also makes it possible to reduce the force in the direction of the gravity which is exerted on the X-axis guide 43 by the X-axis slider 33 through the X-axis slide elements 45.

Figure 4:
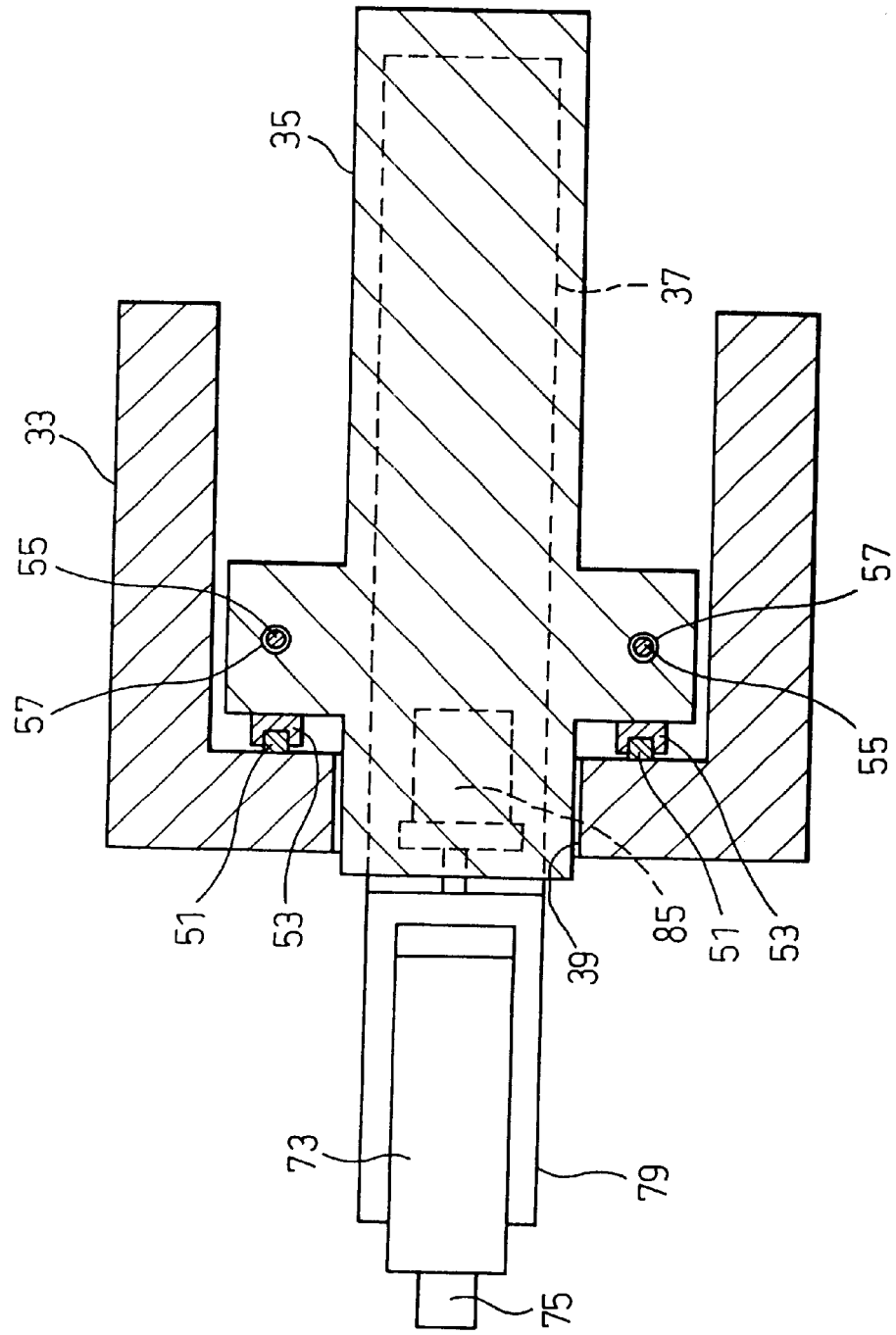
FIG. 4 is a sectional view of an X-axis slider and a Y-axis slider of the spindle support structure of in FIG. 2, as taken along line IV—IV.

Referring to FIG. 4, which is a sectional view of the X-axis slider 33 and the Y-axis slider 35 of FIG. 2, taken along the line IV—IV, the frame-shaped X-axis slider 33 is provided therein with a combination of a motor (not shown) i.e., a Y-axis feed means, with ball screws 55, and rail-shaped Y-axis guides 51. On the other hand, the Y-axis slider 35 is symmetrically provided on the right and left sides Y-axis slide elements 53 in mesh with the rail-shaped Y-axis guides 51 located on the X-axis slider 33, so that the Y-axis slider 35 is guided in the direction of the Y-axis by the Y-axis guides 51 and the Y-axis slide elements 53. Referring to FIG. 4, the ball screws 55 of the Y-axis feed means are also screwed into the threaded holes of nuts 57 (only the threaded holes of the nuts are shown in the drawing) which extend through the Y-axis slider 35 and which are symmetrically arranged on the Y-axis slider 35. Therefore the rotation of the ball screws 55 by a motor (not shown) is transmitted through the nuts 57 to the Y-axis slider 35, which is in turn guided by the Y-axis guides 51 and the Y-axis slide elements 53 to move in the direction along the Y-axis in the through opening 39.

Figure 5:
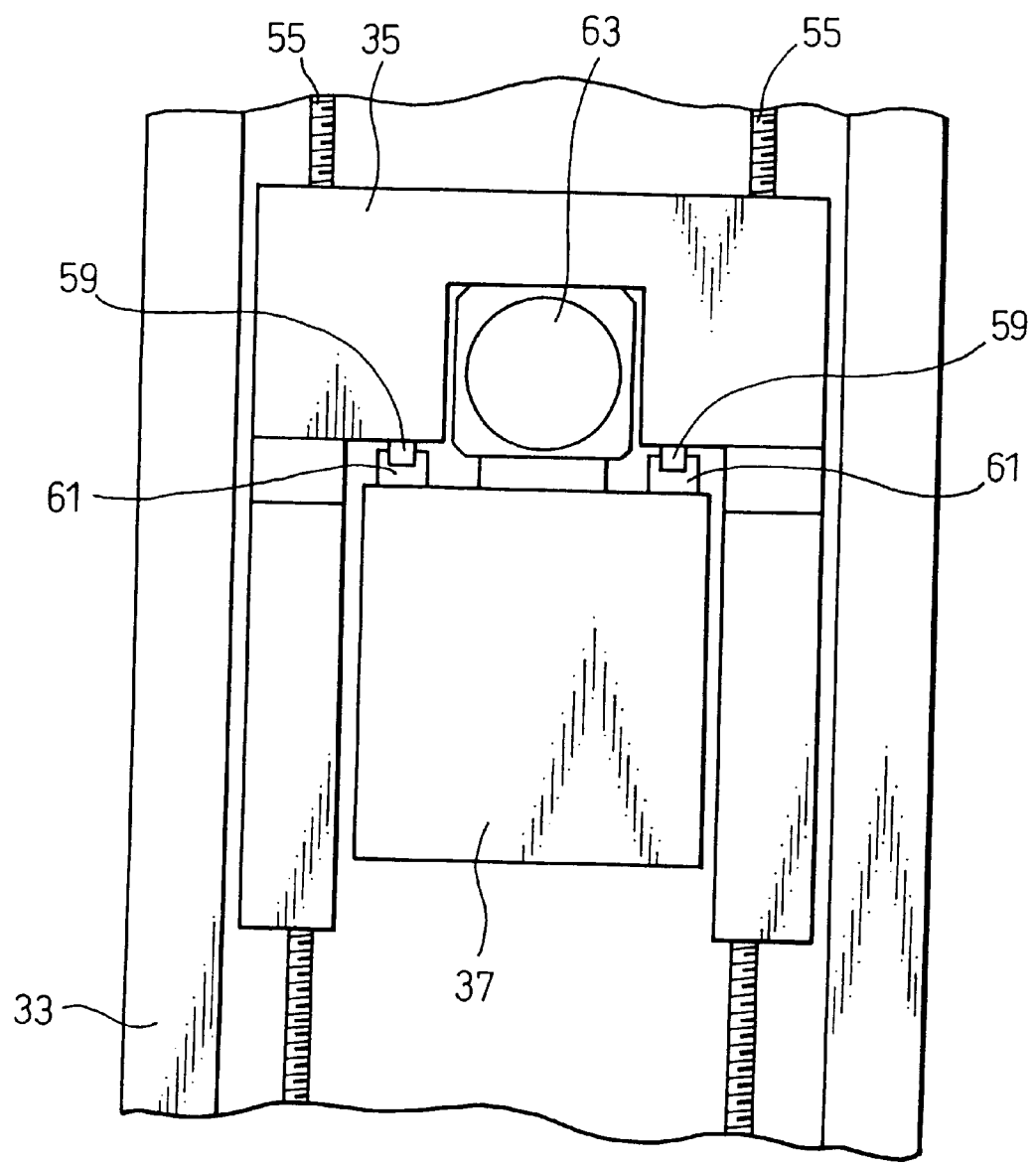
FIG. 5 is a back elevation of the Y-axis slider of the spindle support structure, as taken from the direction of an arrow V of FIG. 2.

Referring to FIG. 5 which is a rear elevation view of the Y-axis slider 35, as taken from the direction of an arrow V of FIG. 2, the Y-axis slider 35 is formed with a space extending therethrough in the direction along the Z-axis, which space accommodates therein a Z-axis slider 37. The space also fixedly accommodates a Z-axis motor 63, i.e. a Z-axis feed means, as well as two rail-shaped Z-axis guides 59.

On the other hand, the Z-axis slider 37 is provided with a Z-axis slide elements 61 in mesh with the Z-axis guides 59 located in the space inside of the Y-axis slider 35. Similarly to the Y-axis slider 35, the rotation of the Z-axis motor 63 mounted on the Y-axis slider 35 is transmitted through ball screws (not shown), so that the Z-axis slider 37 moves in the direction along the Z-axis within the space inside of the Y-axis slider 35.

This allows the movable body 21 to move in the three directions along the X- Y- and Z-axes.

It should be noted that the Y- and Z-axis feed means are described as a combination of a motor and ball screws, although a linear motor can be used alternatively. The through opening 39 above and below the Y-axis slider 35 are covered with a telescopic cover (not shown) to prevent the intrusion of chips or cutting fluid.

Figure 6:
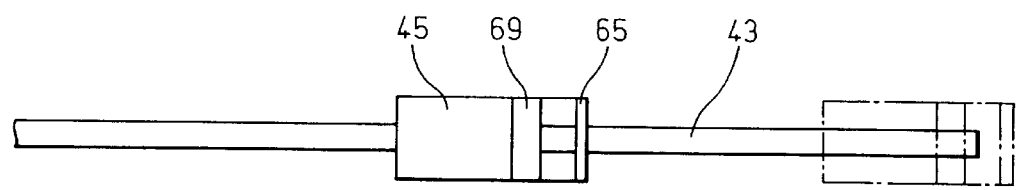
FIG. 6 is a schematic diagram for illustrating a structural relationship of an X-axis guide and an X-axis slide element shown in FIG. 3.
Figure 7:
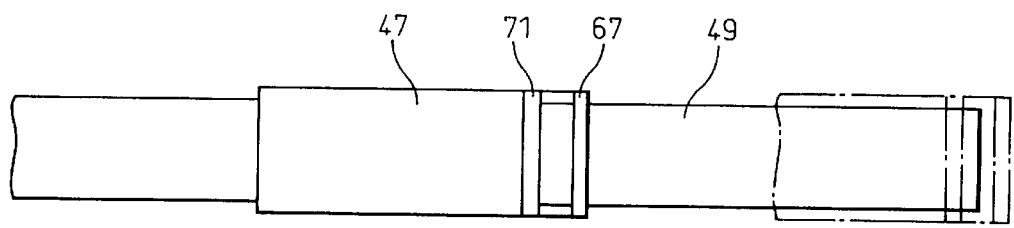
FIG. 7 is a schematic diagram for illustrating a structural relationship of a stator and a mover of a linear motor shown in FIG. 3.

FIG. 6 is a schematic diagram for illustrating a structural relationship of the rail-shaped X-axis guide 43 and the X-axis slide element 45 shown in FIG. 3, and FIG. 7 is a schematic diagram for illustrating a structural relationship of the mover 47 and the stator 49 of the linear motor shown in FIG. 3.

As shown in FIGS. 6 and 7, wiper means for removing the chips and the cutting fluid attached on the X-axis guides 43 and on the stator 49 of the linear motor can be mounted on the outermost sides of the X-axis slide element 45 and the mover 47 of the linear motor positioned at the two X-axis ends of the X-axis slider 33. Preferably, the wiper means includes no-contact wipers 65, 67 arranged on the forward end side of the X-axis slide element 45 and on the forward end side of the mover 47 of the linear motor and contact wipers 69, 71 spaced inwardly apart from the no-contact wipers 65, 67. The no-contact wipers 65, 67 are not in direct contact with the X-axis guide 43 or the stator 49 of the linear motor, respectively, but function to remove large chips attached on them, whereas the contact wipers 69, 71 are in direct contact with the X-axis guide 43 or the stator 49 of the linear motor and function to remove fine chips and the cutting fluid attached on them. A polymeric material such as polyurethane impregnated with oil for lubrication can be used for the contact wipers 69, 71. An appropriate material can be used for the no-contact wipers 65, 67.

Such wiper means can of course be disposed at the front and rear ends of the individual X-axis slide element 45 and the individual mover 47 of the linear motor.

At the X-axis stroke ends of the X-axis guide 43 and of the stator 49 of the linear motor, as indicated by dashed line in FIGS. 6 and 7, the contact wipers 69, 71 may move to the end of the X-axis guide 43 or the stator 49 of the linear motor while the no-contact wipers 65, 67 may move to a position beyond the end of the X-axis guide 43 or the stator 49 of the linear motor. This configuration allows the chips and the cutting fluid wiped off from the X-axis guide 43 and the stator 49 of the linear motor by the contact wipers 69, 71 and the no-contact wipers 65, 67 to be removed out of the ends of the X-axis guide 43 and the stator 49.

The compressed air may be also blown out of the X-axis slide element 45 or the mover 47 of the linear motor to assist in blowing off the chips and the cutting fluid attached on the X-axis guide 43 or the stator 49 of the linear motor.

The provision of the wiper means such as the contact wipers, the no-contact wipers and the injection unit for the compressed air can assure the smooth movement of the X-axis slide element 45 or the mover 47 of the linear motor along the X-axis guide 43 or the stator 49 of the linear motor, respectively, which otherwise might be hampered by the chips or cutting fluid caught between the X-axis guide 43 and the X-axis slide element 45 or between the mover 47 and the stator 49 of the linear motor. Thus, the failure frequency of the guiding mechanism or the driving mechanism is reduced for an improved operating rate of the machine tool.

Conventionally, the X-axis guiding and driving mechanism is provided with a movable cover for blocking chip intrusion. The use of this movable cover for a long period of time often causes a malfunction due to wear. However, the need for the movable cover can be eliminated by accommodating the X-axis guides 43, the X-axis slide elements 45, and the mover 47 and the stator 49 of the linear motor in the longitudinal space opening downwardly and by the provision of the wiper means for the X-axis slide element 45 and the mover 47 of the linear motor. Therefore, the machine downtime due to a malfunction caused by the movable cover can be avoided, resulting in an improved operating rate of the machine tool. Another advantage is to reduce a loss of the feed power which has thus far been caused by the movable cover.

Referring to FIGS. 2 and 4, a spindle head 73 for rotatably supporting the spindle 75 having a tool mounted thereon is held at the front end of the Z-axis slider 37 of the movable body 21.

Figure 8:
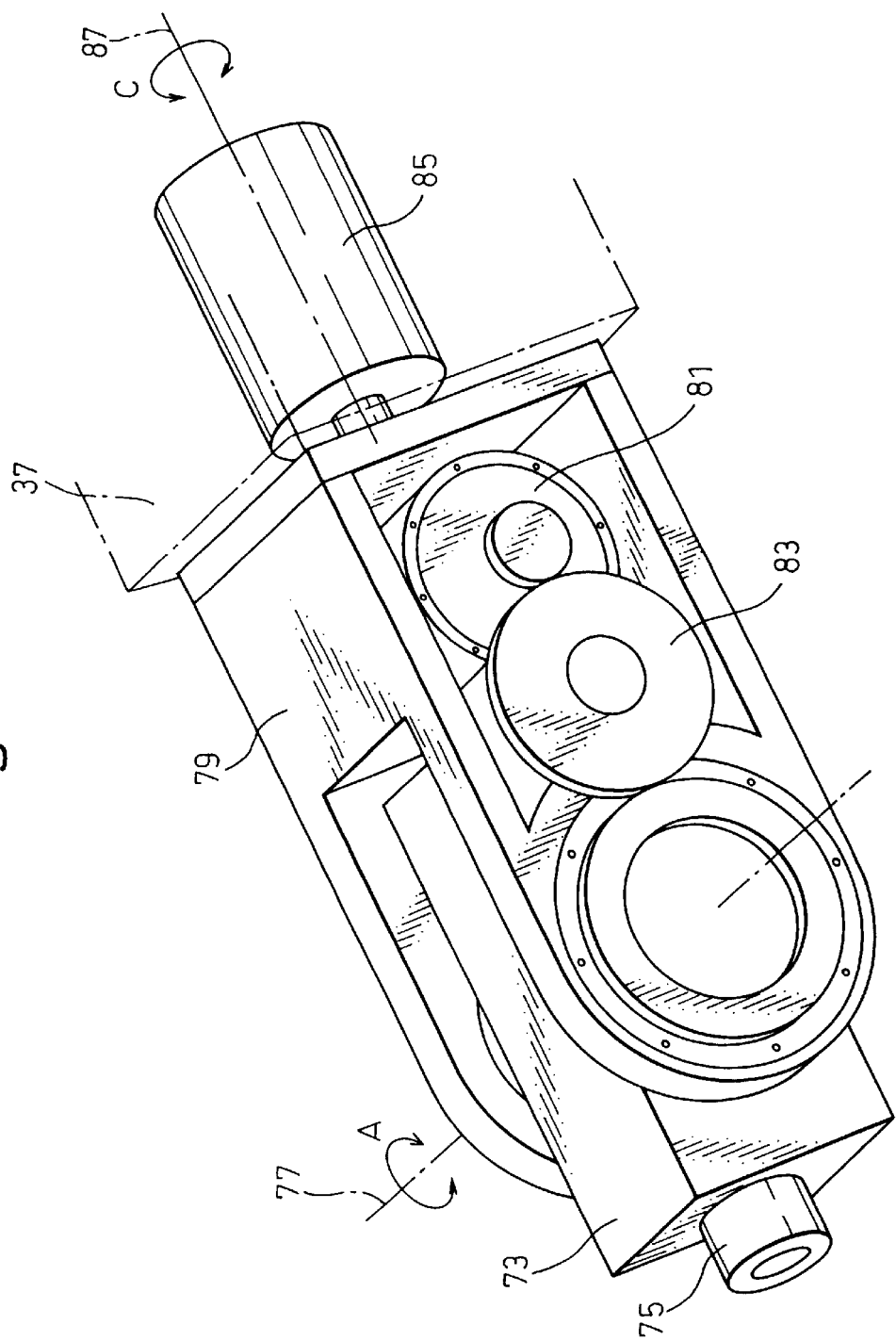
FIG. 8 is a detailed view of the portion including a swivel base and a spindle head shown in FIG. 2.

As shown in FIG. 8 which is the detailed view of the portion including the spindle head 73, the spindle head 73 is rotatably supported on a swivel base 79 in the direction along the A-axis about the rotational axis 77 perpendicular to the direction along the Z-axis, and can be rotated through a gear 83 by a swivel motor 81 fixed on the swivel base 79. The swivel base 79, in turn, is connected to a C-axis motor 85 fixed on the Z-axis slider 37 so that it can be rotated by the C-axis motor 85 in the direction along the C-axis about the rotational axis 87 extending in the direction along the Z-axis. Therefore, the spindle head 73 is rotatable in the directions along the A- and C-axes, thereby making it possible to handle a complicated machining process. The same gear train as the gear 83 is also located on the opposing side of the swivel base 79 so that the rotational feed drive along the A-axis is carried out on both left and right sides. Thus, a highly precise rotational feed is possible.

The spindle head 73 may be adapted to be fixedly mounted on the Z-axis slider 37 and to rotate in the direction neither along the A-axis, the B-axis or the C-axis. The spindle 75 may be also movable in the direction along the Z-axis (what is called a W-axis) with respect to the spindle head 73.

Next, the workpiece support structure 15 will be described.

Figure 9:
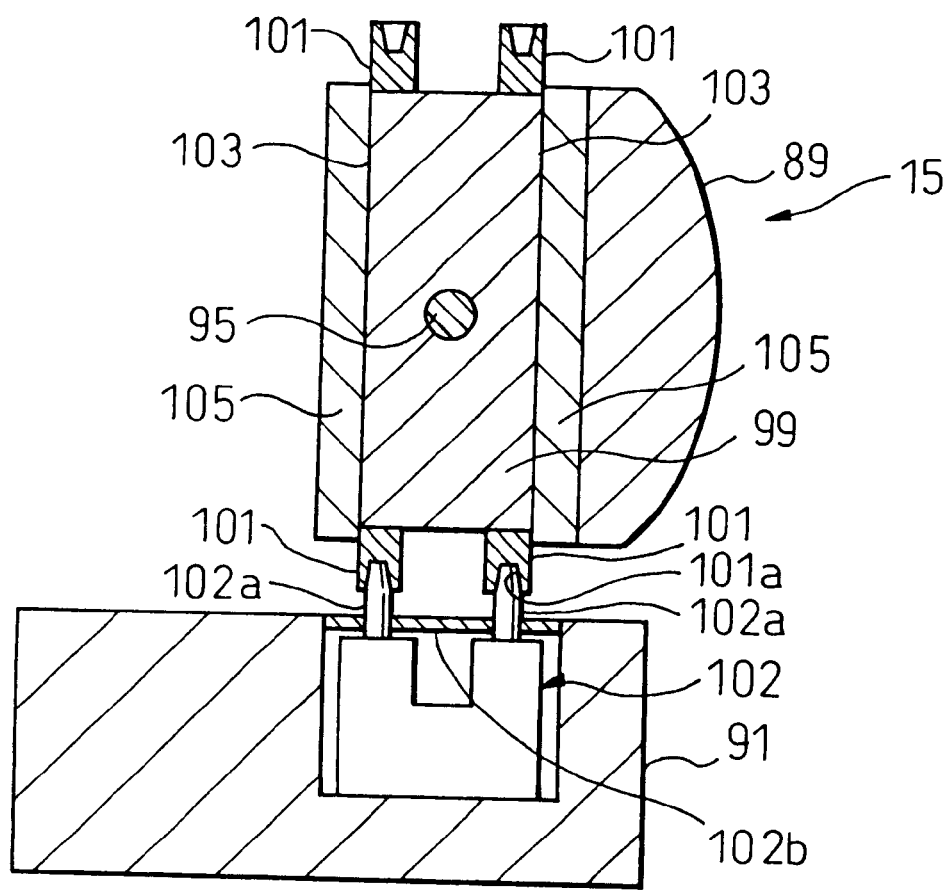
FIG. 9 is a sectional view of a workpiece support structure of FIG. 1, taken along line IX—IX.

FIG. 9 is a partial sectional view of the workpiece support structure 15 of FIG. 1, taken along line IX—IX.

Referring FIGS. 1 and 9, the workpiece support structure 15 includes a base 91, two shaft support means 93 located at the ends of the base 91 along the X-axis, a generally rectangular workpiece mounting table 99 connected to the shaft support means 93 through a rotating shaft 95 and supported rotatably about a horizontal rotational axis 97 extending in the direction along the X-axis, and an indexing motor 100 for indexably rotating the workpiece mounting table 99 through the transmission device (not shown) including a gear and a belt. The workpiece mounting table 99 can be rotationally indexed to a plurality of positions by the indexing motor 100 or the toothed clutch (not shown). It should be noted that the indexing motor is referred to as an indexable motor represented by a servomotor.

The workpiece mounting table 99 has two pallet mounting surfaces 103 which are arranged on the opposite sides about the rotational axis 97. The workpiece 89 is mounted directly or through a pallet 105 on the pallet mounting surface 103. As will be described hereinafter, the pallet mounting surface 103 of the workpiece mounting table 99 is provided with pallet securing means 106 (see FIG. 12) for releasably supporting and securing the workpiece 89 or the pallet 105 on the pallet mounting surface 103 of the workpiece mounting table 99. For the purpose of simplification of description, in the following description, the pallet 105 having the workpiece 89 mounted thereon is mounted on the pallet mounting surface 103. It is, however, possible to mount the workpiece 89 directly on the pallet mounting surface 103, as described above.

As shown in FIGS. 1 and 9, the workpiece support structure 15 has the two pallet mounting surfaces 103. Therefore, while the machining process is performed on one pallet mounting surface 103 opposite to the spindle support structure 13, the setup process for the workpiece 89 can be carried out on the other pallet mounting surface 103 in parallel to the machining process on the first pallet mounting surface 103.

Further, by means of the indexing motor, the workpiece mounting table 99 can be positioned at such at least four rotational positions as to allow the two opposed pallet mounting surfaces 103 to be in a horizontal state and to be in a vertical state. More specifically, the pallet mounting surface 103 can be brought into the vertical state when the workpiece 89 is machined, and be brought into the horizontal state when the pallet 105 having the workpiece 89 mounted thereon is mounted or demounted on/from the pallet mounting surface 103. Therefore, even when the workpiece 89 is machined while being supported vertically, the pallet 105 can be brought for the setup process into the horizontal state so that the setup process including the mounting/demounting process of the pallet 105 (having the workpiece 89 mounted thereon) on and from the pallet mounting surface 103 can be performed easily and safely, thereby to reduce the time for replacing the workpiece 89.

In the machining process, a great force acts on the workpiece support structure 15 from the spindle support structure 13. When the point of application of this force is offset from the rotational axis 97 of the workpiece mounting table 99, a rotation moment is generated at the workpiece mounting table 99. The rotation of the workpiece mounting table 99 caused by the rotation moment degrades the precision in the machining of the workpiece 89. However, the function to block the rotation of the workpiece mounting table 99 is achieved only by the holding torque of the indexing motor 100 and by the toothed clutch, and this may not be enough.

Therefore, the workpiece support structure 15 of the machine tool 11 according to the present invention further includes a locator pin device 102 disposed on the base 91 for holding the rotational position in which the pallet mounting surface 103 is in vertical state in the machining process and provided with two extendable locator pins 102a extending upwardly, and shaft lock devices 104 disposed on the shaft support means 93 for locking the rotation of the rotating shaft 95.

The workpiece mounting table 99 is provided, on its two side arranged about the rotational axis 97 at positions perpendicular to the pallet mounting surfaces 103, with two locator brackets 101 associated with the locator pin device 102. Each locator bracket 101 is positioned so that it can be opposed to the leading end of each locator pin 102a of the locator pin device 102 when the pallet mounting surface 103 is in vertical state, and is provided at its leading end portion with a hole 101a for receiving the locator pin 102a. Preferably, the hole 101a has a frusto-conical shape, and the locator pin 102a correspondingly has a frusto-conical shaped leading end.

In the operations of the locator pin device 102, the locator pins 102a can retract toward the base 91 to prevent the locator pins 102a from obstructing the rotation of the workpiece mounting table 99, while the workpiece mounting table 99 is rotationally indexed, On the other hand, the locate pin 102a can be inserted into the hole 101a of the locator bracket 101 thereby to prevent the rotation of the workpiece mounting table 99, after the workpiece mounting table 99 was rotationally indexed, that is, in the machining process.

The locator pins 102a can prevent such a deformation of the workpiece mounting table 99 along the X-axis, which easily occurs when the workpiece mounting table 99 becomes longer in the X-axis direction, by applying an upward pushing force to the workpiece mounting table 99. Therefore, the locator pins 102a can achieve an effect of providing a highly precise machining of the workpiece 89.

As the mechanism for extending/retracting the locator pins 102a, the locator pin device 102 may use a cylinder device or another suitable mechanism including a mechanism utilizing a servomotor and a gear or a mechanism utilizing a nut and a ball screw.

Further, the locator pin device 102 is preferably accommodated in the base 91, as shown in FIG. 9, and is more preferably covered with a shutter 102b having an opening for allowing only the locator pins 102a to extend through the shutter 102b, in order to prevent chips, the cutting fluid and etc. to enter into the locator pin device 102. The shutter 102b can close and open to come into a closed position from an opened position when the pallet mounting surfaces 103 is in the vertical state.

The shaft lock device 104 includes, for example, a shaft lock pin (not shown), and a suitable pin drive mechanism having a combination of a cylinder device, a servomotor, a gear and the like. In case that the shaft lock pin is employed, the rotating shaft 95 is formed with a plurality of anti-rotation holes (not-shown) spaced about the rotational axis 97, for receiving the shaft lock pin (not-shown) of the shaft lock device 104. The anti-rotation holes are arranged so that the pallet mounting surface 103 may be locked at positions where the pallet mounting surface 103 is at least in the horizontal state and the vertical state. Preferably, the four anti-rotation holes are arranged at an interval of 90 degrees about the rotational axis 97.

In the operations of the aforementioned embodiment of the shaft lock device 104, the shaft lock pin of the shaft lock device 104 is disengaged from the anti-rotation holes of the rotating shaft 95 while the workpiece mounting table 99 is being rotationally indexed by the indexing motor 100, in order to prevent the shaft lock pin from obstructing the rotation of the workpiece mounting table 99. On the other hand, after the workpiece mounting table 99 is rotationally indexed to the positions where the pallet mounting surface 103 is in the horizontal state or the vertical state, the shaft lock pin of the shaft lock device 104 is inserted into the anti-rotation hole to prevent the rotation of the workpiece mounting table 99.

The shaft lock device 104 may be constructed as a braking device including an electromagnetic brake.

The locate pin device 102 and the shaft lock device 104 may be activated at least while the workpiece 89 is being machined, that is, only when the pallet mounting surface 103 of the workpiece mounting table 99 is indexed at the position wherein it is in the vertical state.

In view of the structural simplicity and stability, the embodiment shown in FIGS. 1 and 9 employs the two locator brackets 101 and the corresponding two locator pins 102a in order to prevent the rotation of the workpiece mounting table 99. However, it may employ one locator bracket and one locator pin, or three or more locator brackets and locate pins. The workpiece mounting table 99 need not be provided with the locator bracket 101 but may be provided directly in its side face with holes for receiving the leading end of the locator pins 102a. With the locator brackets being eliminated from the workpiece mounting table 99, likewise, the surfaces of the leading ends of the locator pins 102a could be brought into contact with the side face (i.e., the face substantially perpendicular to the pallet mounting surface 103) of the workpiece mounting table 99, so that the rotation of the workpiece mounting table 99 may be prevented by the frictional force acting between the locator pin 102a and the side face.

In case that the locator bracket 101 and the locator pin device 102 are not used but only the shaft lock device is used, the pallet mounting surface 103 can be positioned not to be in the vertical state but to be in an inclined state to machine an oblique portion of the workpiece.

In this way, the workpiece support structure 15 of the machine tool 11 according to the present invention is provided with the rotational indexing means which is constructed of the indexing motor 100, the locator brackets 101, the locator pin device 102 associated with the locator brackets 102, and the shaft lock device 104. Thus, the workpiece support structure 15 ensures the highly precise machining by locking the workpiece mounting table 99 at positions where the pallet mounting surface 103 is in the horizontal state or vertical state. Any one of the locator bracket 101, the locator pin device 102 associated with the locator bracket 101, and the shaft lock device 104 could be omitted from the rotational indexing means.

The spindle support structure 13 and the workpiece support structure 15 described above are placed with the chip discharge means 17 interposed therebetween as shown in FIG. 1. According to the embodiment shown in FIG. 1, a lift-up chip conveyor is used as the chip discharge means 17 which is driven generally in the direction along the X-axis to discharge the chips produced in the machining area to the outside of the machining area. The lift-up chip conveyor is known and illustrated in simplified fashion in the drawing.

The chips of the workpiece 89 produced in the machining area, after having naturally dropped onto the horizontal travel unit of the lift-up chip conveyor defined as the chip discharge means 17, are lifted up, separated from the cutting fluid and sequentially discharged out of the machining area. Thus, the job of removing the chips from the machining area after machining the workpiece 89 is reduced.

Further, the spindle support structure 13 and the workpiece support structure 15, which are placed with the chip discharge means 17 interposed therebetween, are not required to be integrated with each other. As a result, the spindle support structure 13 and the workpiece support structure 15 can each be produced in a unit, and if connected in alignment along the X-axis, can meet the requirement for a longer workpiece 89 along the X-axis.

Figure 10:
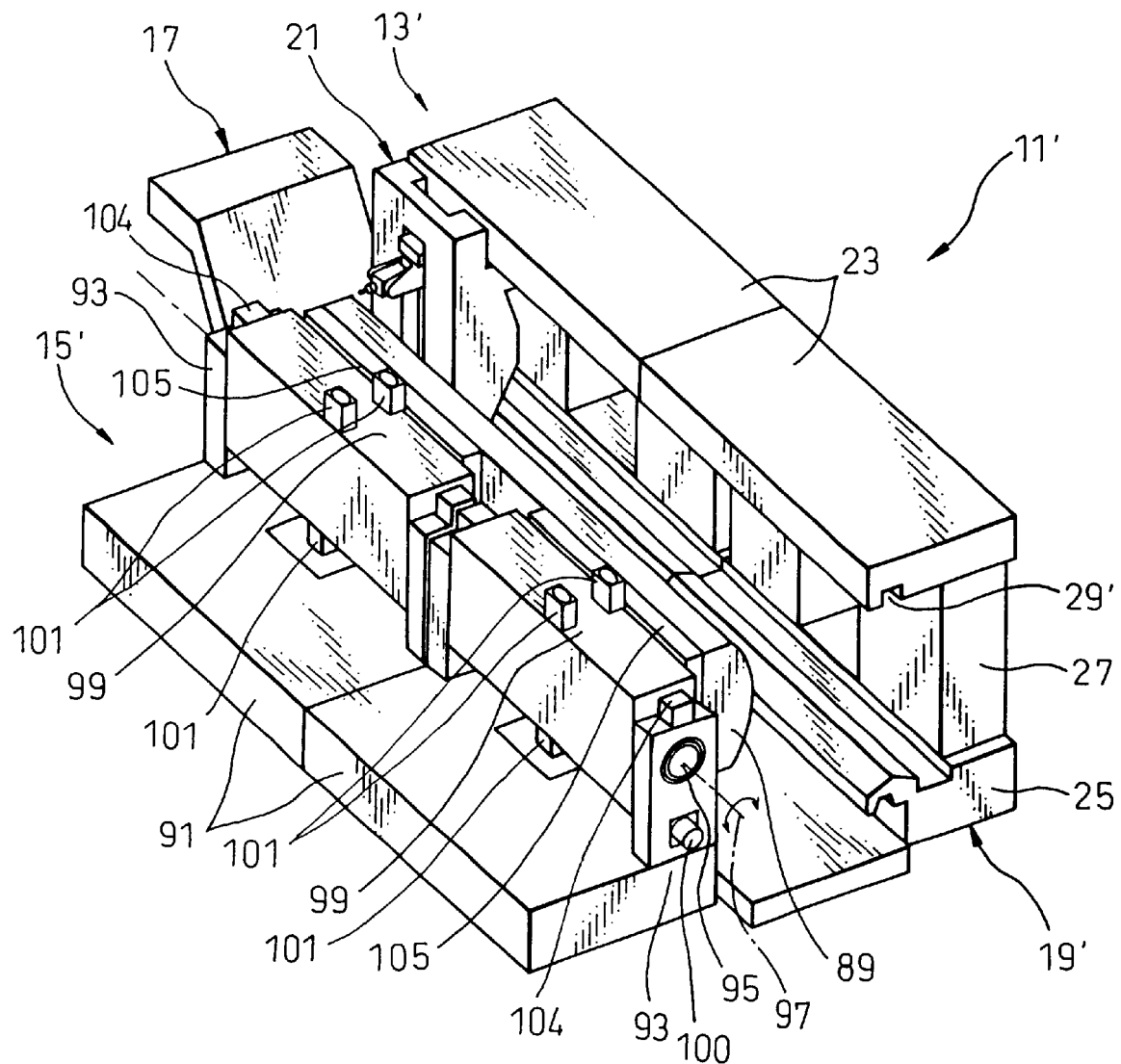
FIG. 10 is a perspective view showing an embodiment of a modularized machine tool according to the present invention.

FIG. 10 shows an embodiment of a machine tool 11' constituted of individual modular units according to the present invention.

According to this embodiment, a plurality of the bases 19 of unit length of the spindle support structure 13 shown in FIG. 1 are coupled in the direction along the X-axis to constitute an extended base 19', so that the X-axis guides 43 and the stator 49 of the linear motor located inside of the upper and lower extended longitudinal spaces 29' of the extended base 19', i.e. the track for the X-axis sliders 33 are extended along the X-axis. An extended spindle support structure 13' is constituted such that a single movable 21 moves along the extended track. On the other hand, an extended workpiece support structure 15' is constituted by coupling a plurality of workpiece support structures 15 of unit length with rotational axes 97 of their workpiece mounting tables 99 in alignment with each other. The extended spindle support structure 13' and the extended workpiece support structure 15' thus constituted are placed with the chip discharge means interposed therebetween, so that the machine tool 11' extended along the X-axis is easily constructed. It should be noted that the chip discharge means 17 can be also extended by constituting the horizontal travel unit thereof in units.

Consequently, this allows a machine tool of a size meeting the demand of the machine tool user to be easily and quickly manufactured. This also prevents each component of the machine tool from being unnecessarily large, thereby facilitating the installation workpiece of the machine tool.

It should be noted that, in the embodiment shown in FIG. 10, the workpiece 89 is mounted over a plurality of workpiece mounting table 99 constituting units and the rotating direction of the workpiece 89 is limited by the presence of the shaft support means 93. Therefore, the advantage of an improved machine operating rate is lost which otherwise might be obtained by the capability of carrying out the setup process for the workpiece 89 on one workpiece mounting surface while the workpiece 89 is being machined on the other workpiece mounting surface. However, this problem can be obviated by connecting the workpiece mounting tables 99 by means of connecting members with the shaft support means 93 of the workpiece support structures 15 removed except the outermost ones and by providing the locating pin devices 102 and the locating brackets 101 at a plurality of positions along the X-axis direction for preventing the deflection of the connected workpiece mounting tables.

Referring to FIGS. 11 to 13, there will be described a pallet carrying system 111 to be used with the machine tool 11 according to the present invention in order to perform the process of mounting the pallet 105 having the workpiece 89 thereon on the workpiece mounting table 99 of the machine tool 11 efficiently, easily and quickly.

FIGS. 11 to 13 show the pallet carrying system 111 which is combined with the workpiece support structure 15 including the workpiece mounting table 99. For the purpose of simplification, although the spindle support structure 13 shown in FIG. 1 is omitted, it is assumed to be so arranged on the lefthand side in the figures as to be opposed to the workpiece support structure 15.

Referring to FIGS. 11 to 13, the pallet carrying system 111 includes a pallet stocker 113 spaced apart from the workpiece support structure 15 for placing the pallets 105 in a horizontal states, and pallet changing means. This pallet changing means includes a frame structure 115 interposed between the workpiece support structure 15 and the pallet stocker 113, and pallet holding means 117 movably supported on the frame structure 115.

The pallet stocker 113 may also be used as a setup station and is preferably provided on its top surface with means 119 for facilitating the sliding motions such as a raised sliding bed or rollers. Further, the setup station may be provided in addition to the pallet stocker 113, or the pallet stocker 113 may be disposed in an isolated room to be used as a cleaning station.

The frame structure 115 is provided with two guiding means 121 opposed to each other. These guiding means 121 include a horizontal portion extending over the workpiece support structure 15 between the workpiece support structure 15 and the pallet stocker 113, and vertical portions extending downwardly from that horizontal portion to the workpiece support structure 15 and the pallet stocker 113, respectively. The pallet holding means 117 moves along the opposed guiding means 121 between the workpiece support structure 15 and the pallet stocker 113. The guiding means 121 themselves may be integrated with the frame structure.

In the embodiments shown in FIGS. 11 to 13, the pallet holding means 117 includes a generally rectangular carrier base 123 movably along the opposed guiding means 121, and arms 125 opposed to the side faces of the carrier base 123 for gripping the pallets 105.

The carrier base 123 is provided with a driving motor 127 (see FIG. 13) connected with a gear or pinion (not-shown), which engages with a rack (not-shown) disposed along the guiding means 121. Thus, the carrier base 123 can be moved along the guiding means 121 by the rack-and-pinion mechanism. Although one driving motor 127 is preferably provided for each guiding means 121 in order to reduce the load on the motor when a large-sized workpiece is carried, the all pallet holding means 117 may share one driving motor 127.

At the two end portions of the guiding means 121 where the pallet holding means 117 should be stopped, there are disposed means (not shown) for detecting the pallet holding means 117. At a position above the workpiece support structure 15 (where the pallet holding means 117 is stopped in FIG. 11), there is also preferably disposed means for detecting the pallet holding means 117. For example, photosensors or limit switches may be used as such detecting means. When the arrival of the pallet holding means 117 is detected by the detecting means, the actuation of the driving motor 127 is stopped. The pallet holding means 117 could also be mechanically stopped by providing a stopper or positioned by forming a recess or protrusion at a portion of the frame structure 115 for engaging with corresponding portion of the pallet holding means 117.

Each arm 125 for gripping the pallet 105 is formed from a C-shaped member so that its base end portion is pivotally supported by the carrier base 123 and that its leading end portions can be opened/closed by extending or retracting cylinder devices 129. When the cylinder devices 129 are retracted, the distance between the leading end portions of the arms 125 is decreased so that the leading end portions of the arms 125 can move below the pallet 105 to grip the pallet 105 between them. When the cylinder devices 129 are extended, on the contrary, the distance between the leading end portions of the arms 125 can be increased to release the pallet 105 between them.

The individual arms 125 can be moved in parallel to the side faces of the carrier base 123 by the cylinder device or the like thereby to increase or decrease the distances between them while keeping the parallel state. Alternatively, the arms 125 may be replaced by a plurality of pawl members which are pivotally connected to the carrier base 123 so that they may be driven to open or close and to grip the pallet 105. Thus, pallet holding means of another type can be used in place of the aforementioned pallet holding means 117.

Although the aforementioned embodiment uses the motor 129 as the driving mechanism for moving the carrier base 123, of course, another type of driving mechanism could be used. For example, a cylinder device can be used. The motor could be also disposed on the frame structure 115 to drive the carrier base 123 by utilizing a chain. In order to reduce the rocking motion which is caused by the inertia of acceleration and deceleration, an acceleration control may be performed for the movement of the carrier base 123 in addition to the aforementioned driving mechanism.

As shown in FIGS. 11 to 13, further, the workpiece support structure 15 may be provided on the side of the pallet carrying system 111 (or on the side opposed to the side of the spindle support structure 13) with a fence 131 for preventing any person from coming into the working space in order to check or clean the machined workpiece 89 while the workpiece support structure 15 is being rotationally indexed. When the workpiece support structure 15 performs the rotational indexing operation, for example, an alarm light 133 may flash, or an infrared sensor or the like may be interposed between a pair of fences 131. Alternatively, a pressure detector may be disposed on the floor of the working space so that the rotational indexing operation of the workpiece support structure 15 may be inhibited while a person is in the working space. Thus, the safety for the worker can be ensured if he performs an operation in the vicinity of the workpiece support structure 15.

In the pallet carrying system 111 shown in FIGS. 11 to 13, the pallet holding means 117 supported between the two opposed guiding means 121 is used as the pallet changing means for carrying and holding the pallet 105. However, this pallet changing means may be replaced, if it is used only for carrying the pallet 105, with the common crane type pallet changer of the prior art, which is constructed of the pallet holding means suspended from and held by one guiding means.

FIG. 14 shows the pallet carrying system 111 which further includes a three-dimensional pallet magazine 135 for the supply of the pallet 105 having the workpiece 89 to the pallet stocker 113 shown in FIGS. 11 to 13 and for the storage of the pallets 105, and pallet transferring means 137 for transferring the pallet 105 between the pallet stocker 113 and the three-dimensional pallet magazine 135.

The three-dimensional pallet magazine 135 is spaced apart from the pallet stocker 113 and has a three-dimensional multi-storied structure so as to store a plurality of setup pallets 105 or pallets 105 having the machined workpiece 89 mounted thereon. The pallets 105 stored at the individual stories are placed on a sliding table 139.

The pallet transferring means 137 is interposed between the pallet stocker 113 and the three-dimensional pallet magazine 135 and is vertically guided at its four corners by four beam members erected on the installation area, so that it can be vertically moved by driving means (not-shown). However, the movement of the pallet transferring means 137 is not limited to the vertical direction but can move, for example, in the horizontal direction on the installation area. The pallet transferring means 137 is also provided with pallet conveying means 141 such as driven rollers for convey the pallets 105 into and out of the transferring means 137.

In case that the pallet carrying system 111 is shared by two three-dimensional pallet magazines 135, as shown in FIG. 14, disposed side by side, one transferring means may be adapted to be movable in the vertical direction and in the horizontal direction. In this case, the pallet transferring means 137 could be formed as a carrying car.

A flat or two-dimensional pallet magazine may be combined with the carrying system in place of the three-dimensional pallet magazine 135.

As shown in FIG. 14, there will be described the flow of the pallet exchange of the workpiece support structure 15 using the pallet carrying system 111 which includes the pallet changing means including the frame structure 115 and the pallet holding means 117, the pallet stocker 113, the pallet transferring means 137 and the three-dimensional pallet magazine 135.

At first, the pallet transferring means 137 is moved to a predetermined story of the three-dimensional pallet magazine 135 so that the pallet 105 having the workpiece 89 mounted thereon, stored in the aforementioned story, is conveyed onto the pallet transferring means 137 by the pallet conveying means 141 disposed in the pallet transferring means 137. Then, the pallet transferring means 137 moves toward the pallet stocker 113 (i.e., downwardly in the vertical direction in FIG. 14) and the pallet 105 is conveyed into the pallet stocker 113 by the pallet conveying means 141.

In case that the pallet stocker 113 is used to function as the setup station, the necessary setup operation is performed on the pallet stocker 113.

Then, the pallet holding means 117 holds the pallet 105 on the pallet stocker 113 and moves toward the workpiece support structure 15 along the guiding means 121 of the frame structure 115 (see FIG. 11).

At this movement, the pallet 105 may possibly rock or incline. However, the pallet holding means 117 is supported at two pairs of opposed portions by the guiding means 121 so that the rocking motions and the inclinations are limited to the rotations about a swivel axis extending between the supporting points of the pallet holding means 117. As a result, the workpiece 89 or the pallet 105 can be precisely positioned, as compared with the common crane which can cause multiaxis rocking motions or inclinations because the workpiece 89 or the pallet 105 is in the suspended state.

When the pallet holding means 117 arrives at the position, as shown in FIG. 11, above the workpiece support structure 15, this arrival is detected by the aforementioned position sensor, and the pallet holding means 117 is caused to wait at that position.

Figure 15A:
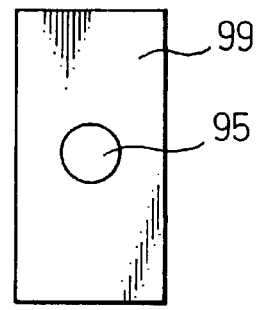
FIG. 15A to FIG. 15F are schematic diagrams for illustrating a method of exchanging pallets according to the present invention.
Figure 15B:
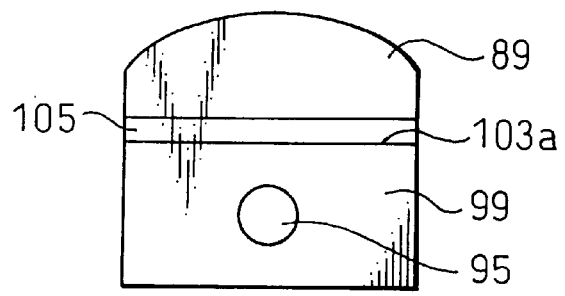

Then, the workpiece mounting table 99 is turned by 90 degrees from the rotational position, as indicated in FIG. 15A, where the pallet 105 is not mounted on the workpiece mounting table 99, so that a pallet mounting surface 103a is directed upwardly to the horizontal state (see FIG. 12 and FIG. 15B). At this time, it is preferred that the rotation of the rotating shaft 95 is locked by the shaft lock device 104 of the workpiece support structure 15.

Then, the pallet holding means 117 is moved downwardly from the position shown in FIG. 11 so that the pallet 105 held by the pallet holding means 117 is released and arranged on the pallet mounting surface 103a by opening the arms 125 of the pallet holding means 117. The workpiece 89 and the pallet 105 held by the pallet holding means 117 may be tilted or inclined about the swivel axis extending between the two supporting points of the guiding means 121, as has been described above. However, the pallet 105 returns to the horizontal state and is arranged at the desired position by abutting against the pallet mounting surface 103a which has been rotationally indexed to the horizontal state. Therefore, there is achieved an effect that the pallet 105 can be highly precisely positioned on the pallet mounting surface 103. It is understood that the effect can be enhanced by locking the rotating shaft 95, i.e., the workpiece mounting table 99 by means of the shaft lock device 104.

Figure 15C:
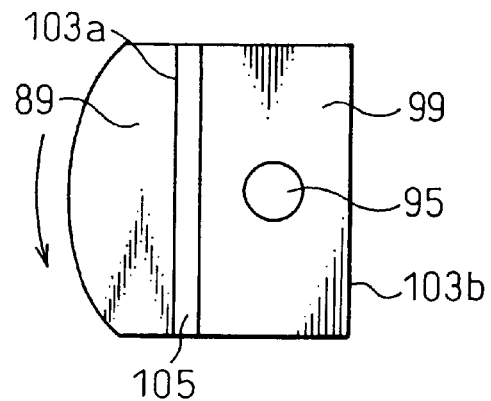

Next, after the pallet 105 is removably mounted on the pallet mounting surface 103a by the pallet securing means 106 on the pallet mounting surface 103a, the workpiece mounting table 99 is turned counter-clockwise by 90 degrees (see FIG. 13 and FIG. 15C). At this rotational position, the shaft lock pin of the shaft lock device 104 of the workpiece support structure 15 is inserted into the anti-rotation hole of the rotating shaft 95 thereby to lock the rotating shaft 95. The two locator pins 102a of the locator pin device 102, as mounted in the base 91, are extended upwardly so that they are individually inserted in the holes 101a of the locator bracket 101, as formed in the side face of the workpiece mounting table 99, to prevent the rotation of the workpiece mounting table 99.

The workpiece mounting table 99 is thus prevented from rotating. Therefore even if the machining of the workpiece 89 is started and the spindle support structure 13 applies, to the workpiece mounting table 99, a force which can generate an rotation moment, the workpiece mounting table 99 and the workpiece 89 do not rotate about the rotational axis and the workpiece 89 can be machined highly precisely.

While the workpiece 89 of the pallet 105 mounted on the pallet mounting surface 103a is being machined by the spindle support structure 13, the pallet holding means 117 returns to the pallet stocker 113, as shown in FIG. 13, and holds the next pallet 105 as in the aforementioned procedure and waits at the position, as indicated in FIG. 11, above the workpiece support structure 15, according to a procedure similar to that described above.

Figure 15D:
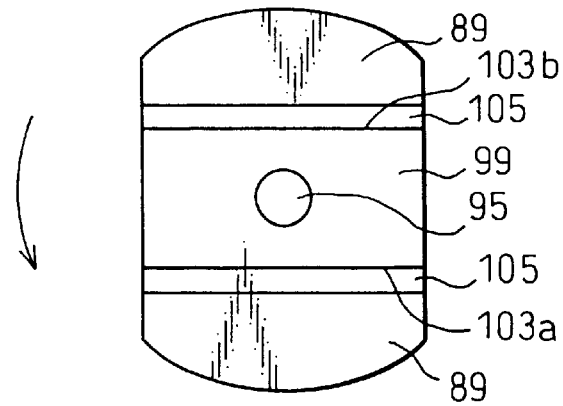
Figure 15E:
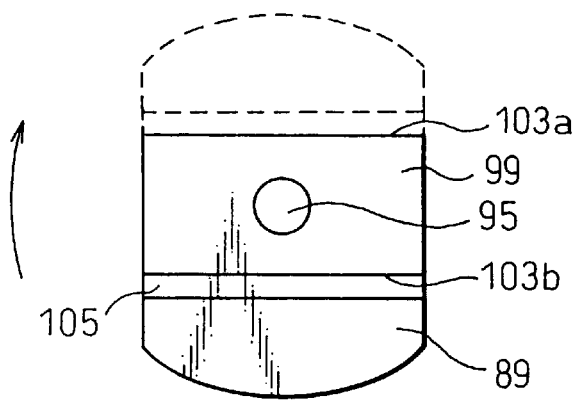

When the machining of the workpiece 89 is completed, the workpiece mounting table 99 is turned counter-clockwise by 90 degrees so that a pallet mounting surface 103b is directed upwardly to the top side. At this time, the chips and the cutting fluid attached to the machined workpiece 89 fall down. Then, the pallet holding means 117 is moved downwardly from the position indicated in FIG. 11, and the next pallet 105 is removably mounted on the pallet mounting surface 103b (see FIG. 15D) in a manner similar to the above. After this, the workpiece mounting table 99 is turned clockwise by 180 degrees to direct the pallet mounting face 103a upwardly to the top side so that the engagement by the pallet securing means 106 is released to bring the pallet 105 into a removable state. Then, the pallet 105 having the machined workpiece 89 mounted thereon is removed from the pallet mounting surface 103a (see FIG. 15E) by the pallet holding means 117.

Figure 15F:
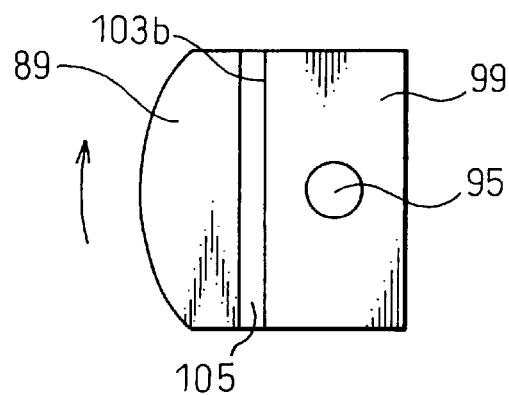

After the pallet 105 having the machined workpiece 89 mounted thereon is removed, the workpiece mounting table 99 is turned clockwise by 90 degrees so that the pallet mounting surface 103b comes into the position where it is opposed to the spindle support structure 13 (see FIG. 15F). Then, there is started the machining of the unmachined workpiece 89 of the pallet 105 which is mounted on the pallet mounting surface 103b. Of course, after the workpiece mounting table 99 is rotationally indexed to the rotational position shown in FIG. 15F and before the machining is started, the rotation of the workpiece mounting table 99 is prevented by the locator brackets 101 and the locator pin device 102, and the rotating shaft 95 is locked by the shaft lock device 104, as described above.

By thus causing the workpiece to be set up, while another workpiece is being machined, to wait above the workpiece mounting table and by providing the rotationally indexable workpiece mounting table with the two pallet mounting surfaces, the workpieces (or pallets) can be exchanged in a short time thereby to improve the operating rate of the machine tool drastically.

Figure 16:
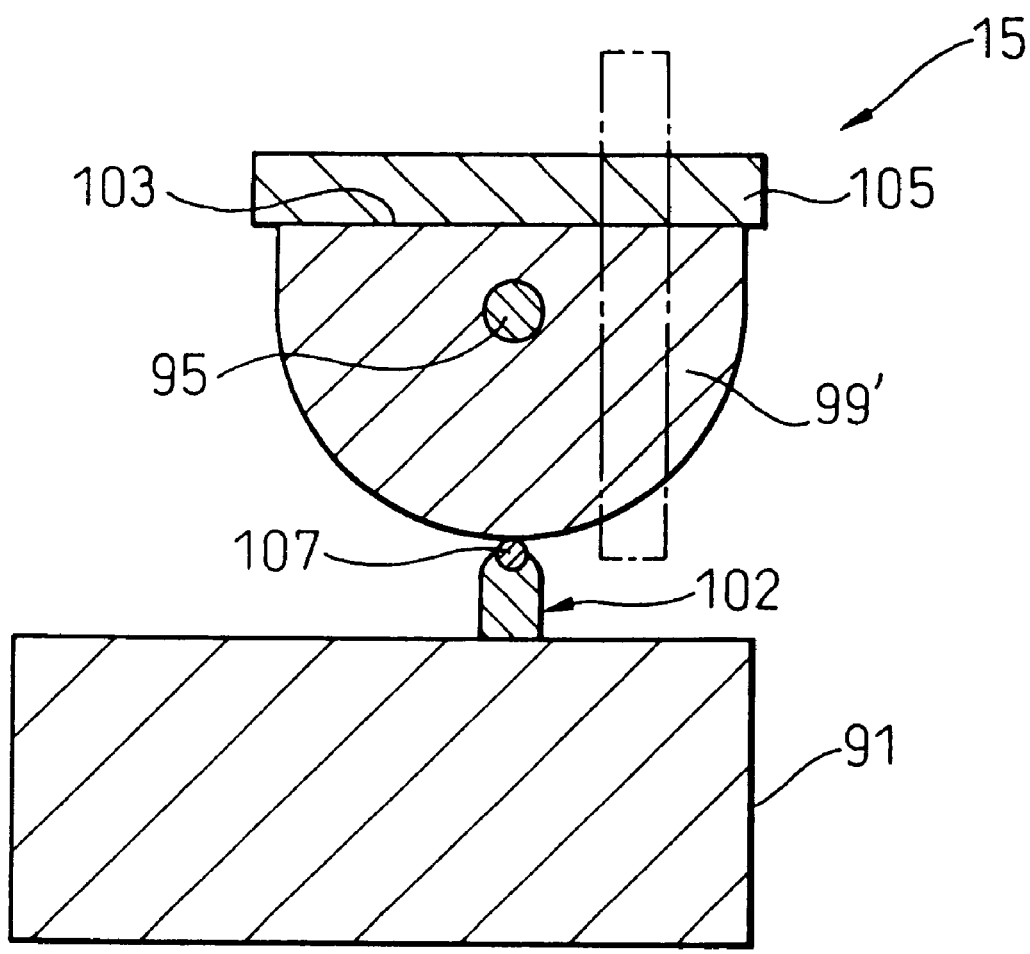
FIG. 16 is a sectional view showing another embodiment of the workpiece mounting table of a workpiece support structure.

A workpiece mounting table 99' according to another embodiment of the workpiece support structure 15 shown in FIG. 16 has a semicircular section and a single pallet mounting surface 103. The pallet mounting surface 103 is provided on its top side with pallet securing means (not-shown). In this case, the setup process of pallet 105 having the workpiece 89 mounted thereon is carried out on the pallet mounting surface 103 at its horizontal position. After this, the workpiece mounting table 99' is turned by 90 degrees and rotationally indexed to the machining position, as indicated by dashed lines in FIG. 16. Thus, the setup process of the pallet 105 is facilitated, with the result that the time required for the setup process of the pallet 105 can be shortened thereby to contribute to the improved efficiency of the machining process. It should be noted that an inclined portion of the workpiece 89 could be machined by setting the pallet mounting surface 103 in the inclined state instead of in the vertical state during the machining of the workpiece 89.

The locator pin of the locator pin device 102 of FIG. 16 pivotally supports a roller 107 at its leading end and is always in pressure contact with the semicircular outer peripheral surface of the workpiece mounting table 99' through the roller 107. This is because the workpiece mounting table 99' of FIG. 16 is required to be turned only by 90 degrees as described above, and the locator pin device 102, even if always in contact with the outer peripheral surface of the workpiece mounting table 99', does not interfere with the rotational indexing of the workpiece mounting table 99'.

Although FIG. 16 shows the embodiment in which the workpiece mounting table 99' of the workpiece support structure 15 has only one pallet mounting surface 103, it is possible to suitably attach, to the machine tool having such a workpiece support structure 15, the pallet carrying system 111 according to the present invention, which includes the pallet stocker 113, the frame structure 115, the pallet holding means 117, the three-dimensional pallet magazine 135 and the pallet transferring means 137, etc. This construction allows the pallet 105 to be carried over the head of the worker or operator, thereby to ensure the access of the worker or operator to the machine tool or the safety of the worker or operator and to make compact the area for installing the machine tool.

The workpiece mounting table of the workpiece support structure 15 can be configured of a triangular pole having a section in the shape of a regular triangle with three pallet mounting surfaces. This workpiece mounting table allows the setup process of the workpiece to be carried out on its first pallet mounting surface directed upwardly by 30 degrees from the horizontal plane and allows the machining of the workpiece to be carried out on its second pallet mounting surface in the vertical state. In this way, during the machining of the workpiece, a setup process for the next workpiece can be carried out, and this setup process can be performed relatively easily by the fact that the first pallet mounting surface is substantially directed upwardly. If the machined workpiece is cleaned on the third pallet mounting surface directed downwardly by 30 degrees from the horizontal plane, the chips and the cutting fluid can easily and naturally fall down and be advantageously recovered, thereby further improving the efficiency of the machining process. The workpiece mounting table could be formed into a polygonal pole shape having four or more pallet mounting surfaces. This modification can also have an advantage similar to the workpiece mounting table having the three pallet mounting surfaces.

Of course, it is possible to suitably attach to the machine tool having such workpiece support structure 15 the pallet carrying system 111 according to the present invention, which includes the pallet stocker 113, the frame structure 115, the pallet holding means 117, the three-dimensional pallet magazine 135 and the pallet transfer means 137, etc.

Although the embodiments has been described in which one pallet carrying system 111 is provided for one machine tool 11, it is possible to provide a plurality of machine tools 11 and one pallet carrying system 111 capable exchanging the pallets 105 with those machine tools 11. In this case, if the pallet carrying system 111 is disabled due to any trouble such as a malfunction or the like, the process of changing the pallet 105 cannot be performed at all. In case that a plurality of machine tools 11 are provided together, therefore, it is preferred to provide a pallet carrying system 111 for each machine tool 11. With this construction being adopted, even if a pallet carrying system 111 becomes disabled, what occurs is that the pallet 105 in the machine tool 11 corresponding to that pallet carrying system 111 cannot carry out the process of changing the pallet 105 and this has no impact on the process of changing the pallet 105 in another machine tools 11. In other words, it is possible to construct a machining system having a good efficiency of the machining in which a partial system down will not cause the whole system to go down.

Figure 17:
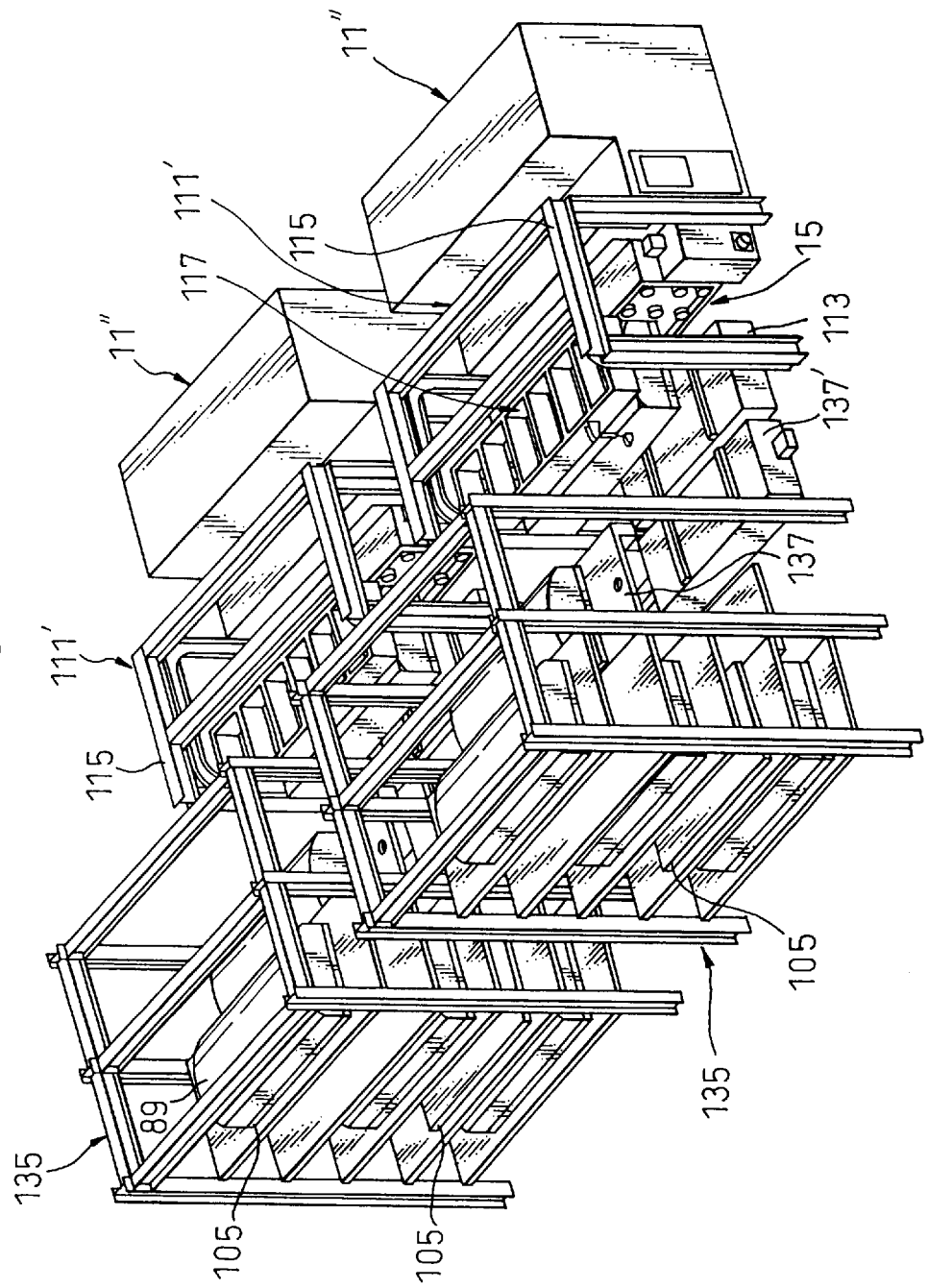
FIG. 17 is a perspective view showing an example of the configuration of a machining system using the machine tool according to the present invention.
Figure 18:
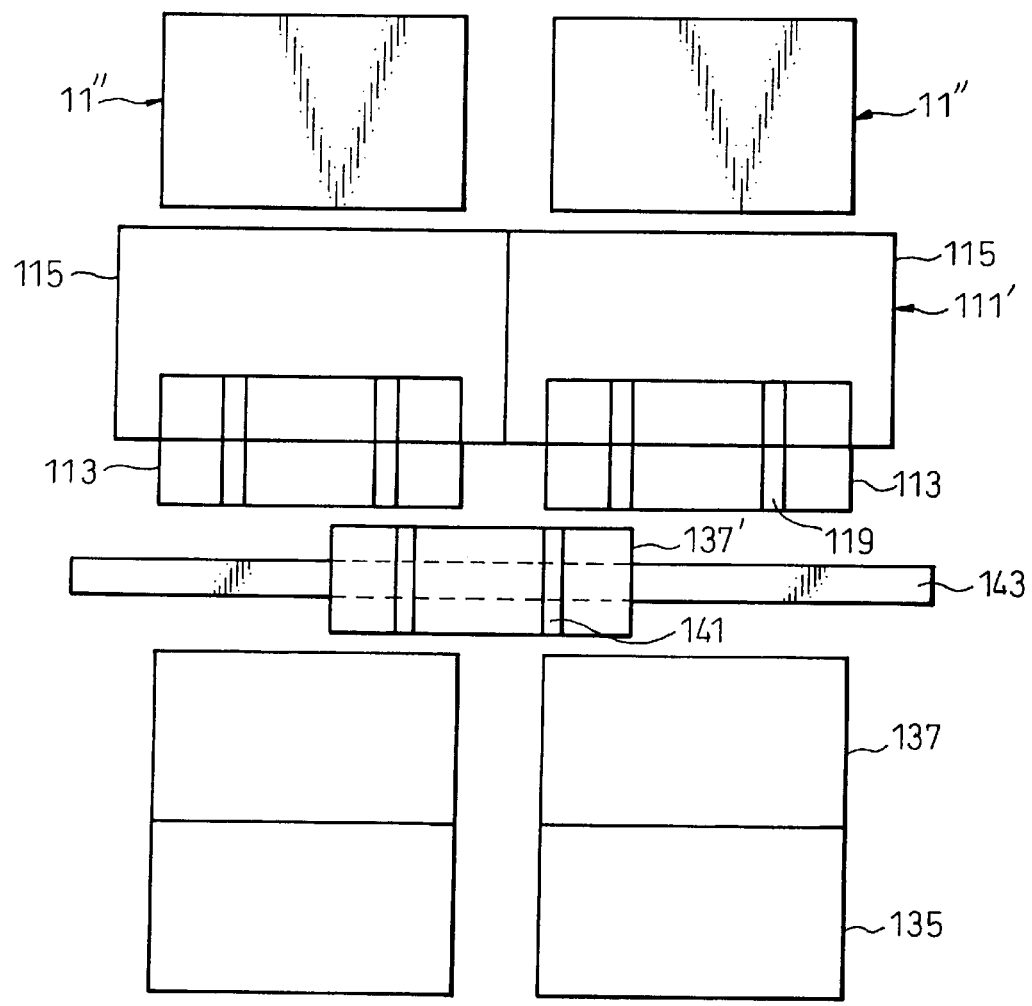
FIG. 18 is a plan view of the machining system of FIG. 17.
Figure 19:
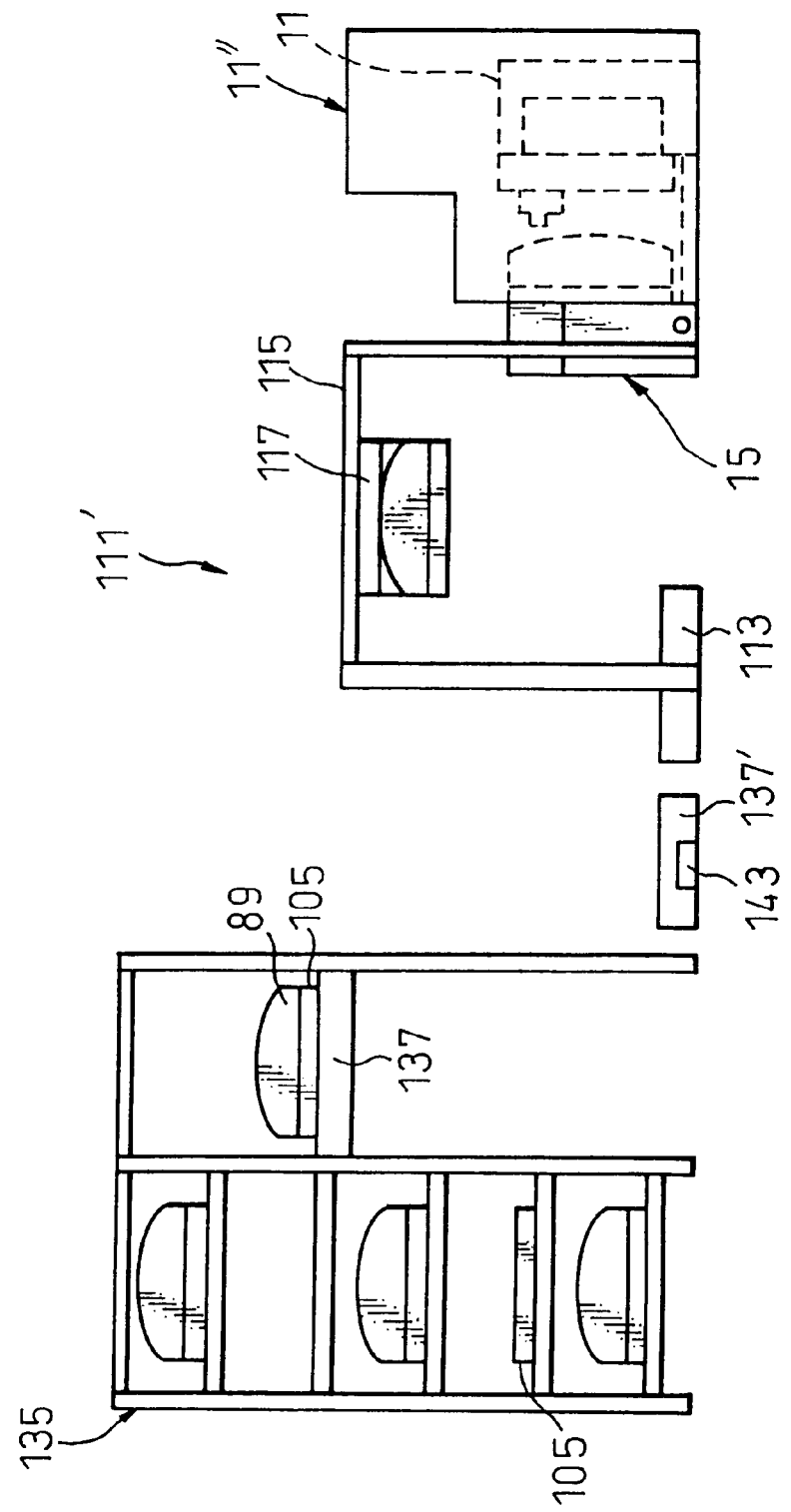
FIG. 19 is a side view of the machining system of FIG. 17.

It is further possible to construct a machining system in which a plurality of blocks including one machine tool and one pallet carrying system are disposed and can share one or more three-dimensional pallet magazine 135. One example of such a machining system is shown in FIGS. 17 to 19, wherein FIG. 17 is a perspective view showing one example of such a machining system; FIG. 18 is a plan view of the machining system of FIG. 17; and FIG. 19 is a side view of the machining system of FIG. 17.

Referring to FIG. 17, a machining system is shown which is provided with two blocks each including a machine tool 11" and a pallet carrying system 111" according to the present invention.

Each of machine tools 11" shown in FIGS. 17 to 19, is similar to the machine tool 11 shown in FIG. 1, except that it is surrounded by and covered with walls and a ceiling so as to prevent the machining fluid or chips from scattering to the surrounding and to isolate the machine tool from the surrounding environment.

Each of pallet carrying systems 111' includes, like the pallet carrying system 111 shown in FIG. 14, the pallet stocker 113, the frame structure 115, the pallet holding means 117 movably supported by the frame structure 115, the three-dimensional pallet magazine 135 provided in an associated relation with the frame structure 115, and the vertically movable pallet transferring means 137. The pallet carrying system 111' shown in FIG. 17 further includes a carriage 137' between the pallet stocker 113 and the three-dimensional pallet magazine 135. This carriage 137' can move horizontally along a track 143 such as rails extending over a plurality of pallet stockers 113 and three-dimensional pallet magazines 135 adjoining each other. Such a carriage 137' is well known in the art and will not be described in more detail.

By the upwardly and downwardly (or vertically) movable pallet transferring means 137 and the horizontally movable carriage 137' as described above, the workpiece 89 and the pallet 105 can be transferred among the three-dimensional pallet magazine 135, and the plurality of pallet stockers 113 and the plurality of machine tools 11". For example, the three-dimensional pallet magazine 135 of one block can supply and store the workpiece 89 and the pallet 105 in connection with the machine tools 11" of another block. As a result, the workpiece can be supplied directly to the pallet stocker 113 of another block without transporting the workpiece 89 and the pallet 105 to another three-dimensional pallet magazine 135. Therefore, even if one machine tool 11" of the machining system ceases its operation, the machining process can be continued by using another machine tool thereby to improve the operating rate.

The workpiece 89 and the pallet 105 can also be transferred between a plurality of pallet magazine and one set of the pallet stocker 113 and the machine tool 11". As a result, the machine tool 11" can use three-dimensional pallet magazines disposed at a plurality of different horizontal positions or flat pallet magazines (including a pallet magazine having workpieces placed flatly at different horizontal positions).

Although the machining system shown in FIGS. 17 to 19 is provided with two sets of machine tools and pallet carrying systems, it may be provided with three or more sets of machine tools 11" and pallet carrying system 111'. Without the carrying car 137', similar effects can, of course, be obtained if the pallet transferring means 137 is adapted to be movable not only in the vertical direction but also in the horizontal direction, as described above.

Although the present invention has been described above with reference to the several embodiments thereof shown in the accompanying drawings, these embodiments are only illustrative but not limitative. For example, the pallet carrying system according to the present invention should not be limited to the machine tools of the aforementioned embodiments but could be suitably adopted in the machine tools of another embodiments. The scope of the present invention should be limited by the appending claims thereof, and corrections and modifications can be made without departing from the scope of the claims.

What is claimed is:

1. A machine tool for machining a workpiece mounted on workpiece mounting table by moving a spindle having a tool mounted thereon in directions along the X-axis, the Y-axis and the Z-axis with respect to the workpiece, said machine tool comprising:

a spindle support structure comprising a base adapted to be located on a floor surface and having guides extending in the direction along the X-axis on the upper and lower portions thereof, an X-axis slider guided along said guides on the upper and lower portions of said base to move from side to side in the direction along the X-axis, said base of said spindle support structure having longitudinal spaces extending in the direction along the X-axis and opening downwardly in the upper and lower portions of said base, respectively, and each of said longitudinal spaces accommodates therein a guide for guiding and supporting said X-axis slider and an X-axis feed means for moving said X-axis slider in the direction along the X-axis, a Y-axis slider guided on said X-axis slider to move upwardly and downwardly in the direction along the Y-axis, a Z-axis slider guided on said Y-axis slider to move forwardly and backwardly in the direction along the Z-axis, and a spindle head mounted on said Z-axis slider to be rotatable in at least one of directions along the A-axis, the B-axis and the C-axis, said spindle head rotatably supporting said spindle;

a workpiece support structure disposed in opposed relation to said spindle support structure and including a workpiece mounting table having two opposed pallet mounting surfaces and pallet securing means arranged thereon, said workpiece mounting table supported to allow for rotational indexing about a horizontal axis extending in the direction along the X-axis; and rotationally indexing means for turning said workpiece mounting table of said workpiece support structure by 90 degrees or 180 degrees to allow said two opposed pallet mounting surfaces to be positioned in an upwardly directed horizontal position or a transversely directed vertical position, said workpiece being mounted on said workpiece mounting table or demounted therefrom when one of said pallet mounting surfaces is in said horizontal position, said spindle support structure machining said workpiece mounted on said workpiece mounting table when one of said pallet mounting surfaces is maintained in vertical position; and chip discharge means interposed between said spindle support structure and said workpiece support structure for discharging chips produced in the machining area to the outside of the machining area.

2. The machine tool according to claim 1, wherein said workpiece mounting table includes a rotating shaft extending therefrom, said workpiece mounting table supported via said rotating shaft to allow for rotational indexing about the horizontal axis extending in the direction along the X-axis, and wherein said rotationally indexing means comprises an indexing motor for rotationally indexing said workpiece mounting table of said workpiece support structure, first positioning means for positioning said workpiece mounting table by engaging with said rotating shaft of said workpiece mounting table of said workpiece support structure, a bracket mounted on said workpiece mounting table of said workpiece support structure, and second positioning means for positioning said workpiece mounting table of said workpiece support structure by engaging with said bracket.

3. The machine tool according to claim 1, wherein said base of said spindle support structure comprises an extended base having a plurality of base units coupled to each other along the X-axis, said base unit having a predetermined X-axis unit length, and wherein said workpiece support structure comprises an extended workpiece support structure having a plurality of workpiece support structure units coupled to each other along the X-axis with the horizontal axes thereof aligned with each other so that the workpiece can be mounted over the plurality of workpiece support structure units, said workpiece support structure unit having a predetermined X-axis unit length.

4. The machine tool according to claim 1, wherein said X-axis slider of said spindle support structure is driven in the direction along the X-axis by linear motors disposed along said guides on the upper and lower portions of said base, respectively and wherein said linear motor includes a stator and a mover arranged on said base and said X-axis slider, respectively, in opposed relation to each other so that an attraction force of said stator acting on said mover reduces the load in the gravitational direction exerted on said guide of said X-axis slider.

5. The machine tool according to claim 1, further comprising:

a setup station spaced apart from said workpiece support structure for a pallet having said workpiece mounted thereon to be placed; and pallet changing means for transferring and carrying said pallet between said pallet mounting surface of said workpiece mounting table of said workpiece support structure in an upwardly directed horizontal position and the top surface of said setup station, by holding said pallet in a suspended manner and by moving along guiding means in the horizontal direction and in the vertical direction.

6. The machine tool according to claim 1, further comprising:

a setup station spaced apart from said workpiece support structure for a pallet having said workpiece mounted thereon to be placed;

pallet changing means for transferring and carrying said pallet between said pallet mounting surface of said workpiece mounting table of said workpiece support structure in an upwardly directed horizontal position and the top surface of said setup station, by holding said pallet in a suspended manner and by moving along guiding means in the horizontal direction and in the vertical direction;

a three-dimensional pallet magazine spaced apart from said setup station and configured to be able to store a plurality of pallets in a three-dimensional manner; and pallet transferring means interposed between said setup station and said three-dimensional pallet magazine and arranged to be movable in the horizontal direction and in the vertical direction for transferring said pallets between said setup station and said three-dimensional pallet magazine.

7. The machine tool according to claim 1, wherein said machine tool comprises:

a plurality of said spindle support structures;

a plurality of said workpiece support structures disposed individually in opposed relation to said plurality of spindle support structures;

a plurality of setup stations individually spaced apart from said plurality of workpiece support structures for a pallet having said workpiece mounted thereon to be placed;

a plurality of pallet changing means for transferring and carrying said pallet between said pallet mounting surface of said workpiece mounting tables of said workpiece support structures in an upwardly directed horizontal position and the top surface of said setup station individually spaced apart from said plurality of workpiece support structures, by holding said pallet in a suspended manner and by moving along guiding means in the horizontal direction and in the vertical direction;

a three-dimensional pallet magazine spaced apart from said plurality of setup station and configured to be able to store a plurality of pallets in a three-dimensional manner; and pallet transferring means interposed between said plurality of setup station and said three-dimensional pallet magazine and arranged to be movable in the horizontal direction and in the vertical direction for transferring said pallets between said plurality of setup station and said three-dimensional pallet magazine.

8. A machine tool for machining a workpiece mounted on a workpiece mounting table by moving a spindle having a tool mounted thereon in directions along the X-axis, the Y-axis and the Z-axis with respect to the workpiece, said machine tool comprising:

a spindle support structure comprising a base adapted to be located on a floor surface and having guides extending in the direction along the X-axis on the upper and lower portions thereof, an X-axis slider guided along said guides on the upper and lower portions of said base to move from side to side in the direction along the X-axis, said base of said spindle support structure having longitudinal spaces extending in the direction along the X-axis and opening downwardly in the upper and lower portions of said base, respectively, and each of said longitudinal spaces accommodates therein a guide for guiding and supporting said X-axis slider and an X-axis feed means for moving said X-axis slider in the direction along the X-axis, a Y-axis slider guided on said X-axis slider to move upwardly and downwardly in the direction along the Y-axis, a Z-axis slider guided on said Y-axis slider to move forwardly and backwardly in the direction along the Z-axis, and a spindle head mounted on said Z-axis slider to be rotatable in at least one of directions along an A-axis, a B-axis and a C-axis, said spindle head rotatably supporting said spindle;

a workpiece support structure spaced apart from said spindle support structure and including a workpiece mounting table having one pallet mounting surface and pallet securing means arranged thereon, said workpiece mounting table supported to allow for rotational indexing about a horizontal axis extending in the direction along the X-axis;

rotationally indexing means by turning said workpiece mounting table of said workpiece support structure by 90 degrees or 180 degrees to allow said one pallet mounting surface to be positioned in an upwardly directed horizontal position or a transversely directed vertical position, said workpiece being mounted on said workpiece mounting table or demounted therefrom when one of said pallet mounting surfaces is in said horizontal position, said spindle support structure machining said workpiece mounted on said workpiece mounting table when one of said pallet mounting surfaces is maintained in vertical position; and chip discharge means interposed between said spindle support structure and said workpiece support structure for discharging chips produced in the machining area to the outside of the machining area.

9. The machine tool according to claim 8, further comprising:

a setup station spaced apart from said workpiece support structure for a pallet having said workpiece mounted thereon to be placed; and pallet changing means for transferring and carrying said pallet between said pallet mounting surface of said workpiece mounting table of said workpiece support structure in an upwardly directed horizontal position and the top surface of said setup station, by holding said pallet in a suspended manner and by moving along guiding means in a horizontal direction and in the vertical direction.

* * * * *